United States Patent [19]
Morganstein et al.

[11] Patent Number: 6,044,140
[45] Date of Patent: *Mar. 28, 2000

[54] COMPUTER CONTROLLED CALL PROCESSOR

[75] Inventors: Sanford J. Morganstein, Elgin, Ill.; Edward F. Tuck, West Covina, Calif.; Bakulesh A. Mehta, Bolingbrook; Herbert B. Krakau, Elmhurst, both of Ill.

[73] Assignee: Aspect Communications Corp., San Jose, Calif.

[*] Notice: This patent is subject to a terminal disclaimer.

[21] Appl. No.: 08/923,223

[22] Filed: Sep. 4, 1997

Related U.S. Application Data

[63] Continuation of application No. 08/612,610, Mar. 8, 1996, Pat. No. 5,666,401, which is a continuation of application No. 08/225,538, Apr. 11, 1994, abandoned, which is a continuation of application No. 07/945,122, Sep. 14, 1992, Pat. No. 5,303,298, which is a continuation of application No. 07/616,652, Nov. 21, 1990, abandoned, which is a continuation of application No. 07/099,388, Sep. 21, 1987, Pat. No. 4,975,941, which is a continuation of application No. 06/593,526, Mar. 26, 1984, Pat. No. 4,696,028.

[51] Int. Cl.[7] ................................ H04M 3/50
[52] U.S. Cl. ........................... 379/210; 379/67.1
[58] Field of Search ............... 379/67.1, 88.16, 379/88.22, 88.23, 88.24, 88.25, 210, 211, 212, 213, 214, 233

[56] References Cited

U.S. PATENT DOCUMENTS

| 3,111,561 | 11/1963 | Dunning | 379/82 |
|---|---|---|---|
| 3,179,750 | 4/1965 | Reilly | 379/234 |
| 3,347,988 | 10/1967 | Marill et al. | 379/93 |

(List continued on next page.)

FOREIGN PATENT DOCUMENTS

| 0090663 | 7/1981 | Japan | 379/84 |
|---|---|---|---|
| 0129469 | 10/1981 | Japan | 379/88 |
| 56-129469 | 10/1981 | Japan | . |
| 56-90664 | 10/1981 | Japan | 379/84 |
| 0028493 | 2/1982 | Japan | 379/84 |
| 0190493 | 2/1982 | Japan | 379/233 |
| 0054492 | 3/1982 | Japan | 379/211 |
| 0181356 | 10/1983 | Japan | 379/88 |
| 0086357 | 5/1984 | Japan | 379/89 |
| 0117894 | 6/1985 | Japan | 379/67 |
| 1397841 | 6/1975 | United Kingdom | 379/213 |
| 2124854 | 2/1984 | United Kingdom | 379/88 |

OTHER PUBLICATIONS

AT&T Advanced 800 Service Publication (70 Pages), undated.

(List continued on next page.)

*Primary Examiner*—Scott L. Weaver

[57] ABSTRACT

Disclosed is an intercept system for integrating the personalized services of switchboard attendants associated with on-premises PBX switching systems, with the capabilities of the intercept system for allowing calling parties the opportunity to complete their own calls to the on-premise switching systems when the telephone extension numbers of the called parties are known to the calling parties. Depending on the mode of system operation selected, the intercept system either presents all incoming calls directly to the switchboard attendants, or intercepts all incoming calls and presents the caller the opportunity to complete the call, or a combination in which incoming calls are first offered to the switchboard attendants for assistance and then after a time wherein attendant assistance is not gained, the call is intercepted and the caller is given an opportunity to complete the call. When a call is intercepted a bidirectional communication path is established between the caller and the intercept system wherein a digital announcement circuit transmits an instructional message to the caller soliciting the dialing of the desired on-premise switching system telephone extension number, and a DTMF receiver collects the dialed extension number digits. The digits are then outpulsed to the on-premises switching system and the call to the desired party is completed without the intervention of a switchboard attendant.

7 Claims, 8 Drawing Sheets

U.S. PATENT DOCUMENTS

| | | | |
|---|---|---|---|
| 3,482,057 | 12/1969 | Abbott et al. | 379/67 |
| 3,510,598 | 5/1970 | Ballin et al. | 379/74 |
| 3,614,328 | 10/1971 | McNaughton et al. | 379/54 X |
| 3,859,473 | 1/1975 | Brown et al. | 379/225 |
| 3,867,582 | 2/1975 | Weed et al. | 379/198 |
| 3,963,875 | 6/1976 | Gueldenpfennig | 379/208 |
| 3,989,901 | 11/1976 | Neuwirth et al. | 379/74 |
| 3,992,587 | 11/1976 | Puckett et al. | 379/96 |
| 4,086,438 | 4/1978 | Kahn et al. | 379/158 |
| 4,088,838 | 5/1978 | Nakata et al. | 379/89 |
| 4,152,547 | 5/1979 | Theis | 379/70 |
| 4,191,855 | 3/1980 | Sakai | 379/102 |
| 4,255,618 | 3/1981 | Danner et al. | 379/88 |
| 4,356,351 | 10/1982 | Shefler et al. | 379/88 |
| 4,376,875 | 3/1983 | Beirne | 379/88 |
| 4,420,656 | 12/1983 | Freeman | 379/73 |
| 4,439,635 | 3/1984 | Theis et al. | 379/87 |
| 4,488,005 | 12/1984 | Frantz | 379/88 |
| 4,544,804 | 10/1985 | Herr et al. | 379/204 |
| 4,608,460 | 8/1986 | Carter et al. | 379/71 |
| 4,611,094 | 9/1986 | Asmuth et al. | 379/89 |
| 4,783,796 | 11/1988 | Ladd | 379/67 |

OTHER PUBLICATIONS

AIS—Automatic Intercept Service (Fujitsu Limited)—date stamped 1972.

Data Set 407 Interface Specification—AT&T, 1975.

Rol Centralized Attendant Service—1979, Rolm Corporation.

"Voice Signalling in the Telephone Network", D.S. Cheeseman, et al., *The Radio and Electronic Engineer*, vol. 53, No. 6, Jun., 1983, pp. 241–247.

"No One Will Miss You When You Are Gone", ROLM Brochure.

"Fingertip Flight Service", S.B. Goibey, *AOPA Pilot Magazine*, Oct. 1985, pp. 50 and 54.

"ARO Goes Pushbutton", *AOPA Newsletter*, Nov. 1985, p. 9.

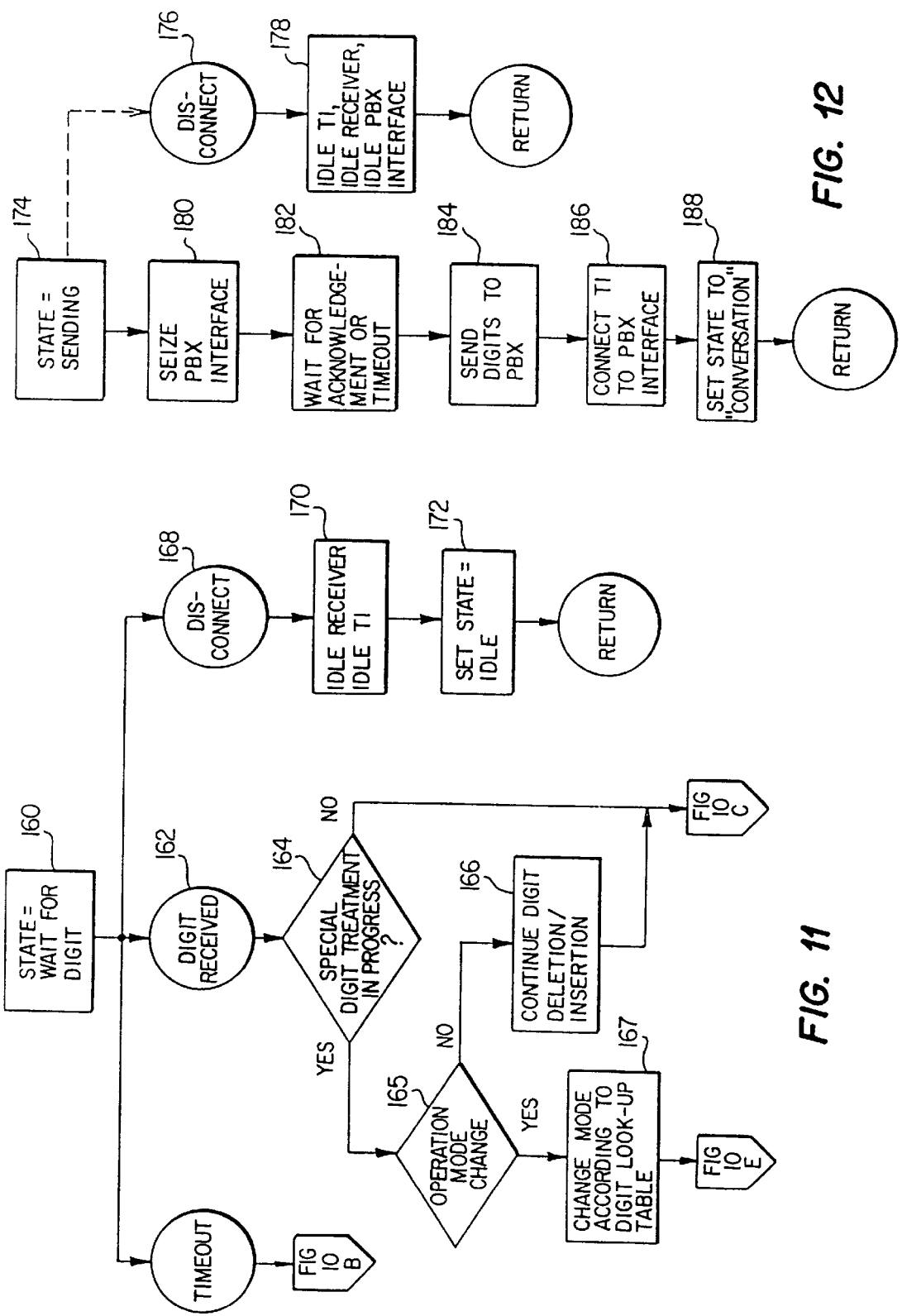

COMPUTER CONTROLLED CALL PROCESSOR

RELATED APPLICATIONS

This is a continuation of U.S. patent application Ser. No. 08/612,610, filed Mar. 8, 1996, now U.S. Pat. No. 5,666,401, which is a continuation of U.S. patent application Ser. No. 08/225,538 filed Apr. 11, 1994, now abandoned, which is a continuation of U.S. patent application Ser. No. 07/945,122 filed Sep. 14, 1992, now U.S. Pat. No. 5,303,298, which is a continuation of U.S. patent application Ser. No. 07/616,652 filed Nov. 21, 1990, now abandoned, which is a continuation of U.S. patent application Ser. No. 07/099,388 filed Sep. 21, 1987, now U.S. Pat. No. 4,975,941, which is a continuation of U.S. patent application Ser. No. 06/593,526 filed Mar. 26, 1984, now U.S. Pat. No. 4,696,028.

BACKGROUND OF THE INVENTION

The present invention relates generally to telecommunications switching systems, and more particularly to switchboard attendant automating systems used with such switching systems.

Attendant switchboards or console systems are well known in the art and serve a necessary function in facilitating the completion of many telephone calls through on-premise facilities. The need for such attendant systems is due, in a large part, to the lack of information to the caller which is necessary to complete the call to a desired destination. While in some instances calls cannot be completed because of particular facility inadequacies, the majority of situations simply involve the lack of information on the part of the caller.

Major efforts and expenditures have been undertaken to aid telephone users in supplying the information necessary to complete calls. Large and complex centralized attendant complexes and intercept systems have been employed to meet the increasing caller demands for assistance in completing telephone calls. U.S. Pat. No. 3,111,561, for example, discloses an intercept system which merely switches various routine prerecorded messages to the calling party, and as a last resort connects the party to an operator. In U.S. Pat. No. 3,859,473 the centralized attendant arrangement is aimed at reducing the number of attendants needed for a plurality of on-premise switching systems by centralizing a fewer number of attendants and allocating the services thereof to the switching system as needed. U.S. Pat. No. 4,200,772 describes a system which employs a plurality of remote site concentrators which serve a corresponding plurality of central offices sites. The remote sites concentrate operator requests into a smaller number of lines, all of which are directed to a computerized central site which further concentrates the lines and makes any operation request available to any switchboard attendant.

While the noted systems serve an intended purpose they offer little help in assisting the completion of calls through switching systems such as Private Branch Exchanges (PBX's), key telephone systems, automatic call distributors (ACD's) and the like where, because of both the nature of the facility or the lack of information, the caller requires the eventual aid of a switchboard attendant.

In a PBX telecommunication system, for example, an outside caller in many cases cannot directly reach a desired PBX subscriber station set, as the general directory number identifies only the business concern, and does not uniquely identify the station set of the party with whom communications is desired. With conventional on premises PBX switching systems or the like, an outside caller's request for service is generally processed by a local central office (CO) which forwards the request for service through a trunk to the PBX system where the call is finally completed. In these instances, the calling party must first dial the general seven-digit business directory number, communicate to the PBX operator the particular extension number of the desired station set, or the called party's name if the extension number is not known to the caller. The operator or attendant then completes the call by dialing into the PBX system the desired station set number. This procedure is commonplace in PBX systems, as well as the other noted types of on premises switching systems, and represents a needless waste of time and duplicated effort especially when the caller knows the station number, but, because it is initially unrecognizable to the PBX system when received over an incoming trunk, cannot dial it directly himself.

This traditional shortcoming of on premises telecommunications systems has been overcome to a certain degree with the use of Direct Inward Dial (DID) trunk facilities where the calling party initially dials the three-digit prefix, and the four-digit extension number. However, because specialized DID trunk facilities require both cooperation between a central office and a PBX system, and a unique telephone numbering plan within the nationwide numbering plan, such an alternative is costly and thus may not be economically justifiable. In addition, many on premises switching systems simply cannot accommodate DID equipment.

With the foregoing in mind, there is a need to provide equipment associated with such on premises switching systems which interacts with the caller and enables an incoming call to be completed directly to the station set when the caller has the information necessary to complete such call —all without the intervention of an attendant, which, in this instance, would be entirely redundant and thus involve a duplicated effort.

There is also a need to supplement on premises switching systems with equipment for initially informing the caller of the identity of the business concern so that if the general seven-digit directory number was initially misdialed, there is no further need to proceed with the call. In addition, there is a need for equipment which solicits from the caller, by way of an instructional message, information concerning the desired extension number, and if known, to then dial it to effect a direct connection to the desired party. In this manner, all the relevant information known by the caller is used to complete the call directly to the desired extension before resort is had, if any, to the assistance of an operator or attendant.

It is therefore an object of the invention to provide a system for use with on premises switching systems which is interactive with the calling party by audio messages to solicit entry into the PBX system, and to receive and utilize information from the caller which information would otherwise be normally supplied by an operator or attendant. The switching system is thus able to complete the communication path between the calling party and the station set without the assistance of a switchboard attendant.

It is another object of the invention to provide a PBX intercept system which relieves the workload of the on premises attendant, and which utilizes the existing facilities of the on premises switching system in such a manner that no modifications are required.

It is a further object of the invention to provide a PBX intercept system which informs callers of often-called numbers, such as a sales department, and to dial abbreviated numbers to reach such departments, whereby upon receipt of such an abbreviated number the intercept system outpulses to the PBX system an associated nonabbreviated telephone extension number.

It is yet another object of the invention to provide a PBX intercept system wherein, in certain situations, a calling party can make a plurality of calls to the PBX switching system without the need of going on-hook after each such call.

It is still another object of the invention to provide a PBX intercept which provides the calling party with an instructional message, and where the calling party, upon recognizing the utilization of the intercept equipment, can dial during the message, or even before the message has substantially started.

A related object of the invention is to provide a PBX intercept system which is adapted to determine when a destination party has not answered a call, and to route such call to an alternative destination.

Another object of the invention is to provide a PBX intercept system which is adapted to integrate the personalized services of attendants with the call intercept capabilities.

A corollary object of the foregoing is to provide an increased flexibility with the PBX intercept by optimizing the personalized service offered by on premises attendants so as to allow such attendants to respond to all incoming calls until the availability of the attendants is exhausted, and in this event the invention automatically intercepts the overflow calls and completes such calls as can actually be completed to the attendant-served on premises switching system.

It is a subsidiary object of the invention to provide an enhanced flexibility with the PBX intercept system by affording a capability ranging from intercepting all calls to the interception of none of the calls, with an intermediate option of intercepting only those calls which are not answered by an attendant within a programmable period of time.

Other objects and advantages of the invention will become apparent from the detailed description of the invention which follows, together with the drawings.

SUMMARY OF THE INVENTION

According to the invention there is provided a PBX intercept system which is interactive with a caller to establish a communication path directly to the desired called party, without the intervention of a switchboard attendant. The PBX intercept equipment is comprised of trunk interface circuits for detecting caller requests for service and for connecting conventional incoming central office trunks to PBX interconnecting lines dedicated to the intercept equipment. Departing from conventional practice, and in one mode of system operation, a number of PBX station lines are connected to the present invention rather than to other PBX subscriber telephone sets.

A switching matrix is connected on one side thereof to the trunk interface circuits, and to the bidirectional ports of a plurality of two-wire to four-wire hybrids on the other side. The unidirectional ports of the hybrids are connected respectively to a plurality of Dual Tone Multifrequency (DTMF) receivers for receiving inwardly dialed information, and connected indirectly to a digital announcement circuit for sending outwardly transmitted audio instructional information.

The PBX intercept trunk interface equipment has an input connected to a standard CO incoming trunk for sensing either conventional ringing current, or CO loop current and CO tip grounds (requests for service) generated by the central office as a result of a CO subscriber dialing thereinto the customary seven-digit directory number. Depending on the mode of system operation, the trunk interface equipment has an output connected to a communication line which is either a dedicated PBX station line or a DID type of trunk.

Since the calling party can ideally complete a call to any one of the plurality of PBX subscriber extensions over the exemplary incoming CO trunk, and determine without the aid of an attendant exactly which telephone extension is to be rung, the present invention provides a digital message circuit and a switchable crosspoint matrix for connecting the digital message circuit to the calling party for instructing the caller to dial the desired extension number into the PBX intercept equipment. If the caller does not know the extension number of the party he desires to communicate with, the instructional message informs the caller either to dial a designated switchboard attendant's number for assistance, or wait for assistance. After a programmable period of time during which dialing information has not been received by the PBX intercept, the switchboard attendant's extension number is automatically dialed by the intercept equipment to the PBX switching system, and the caller is thereby assisted.

In completing a call according to a caller-dialed extension number, the invention is provided with the DTMF receivers which are connectable through the switching matrix to the incoming CO trunk for receiving the dialed extension number and preparing it for subsequent storage in digital form. The various circuits of the PBX intercept equipment are monitored and controlled by a central processing unit (CPU) which examines the dialed extension number to determine whether it is a valid extension number, and if so, to thereafter seize the PBX switching system and cause a transmission of the extension number to the PBX over the communication line. Based upon a conventional PBX translation of the telephone extension number received from the PBX intercept equipment, the PBX switching system establishes a communication path between the called party's telephone extension set and the communication line dedicated to the intercept equipment. Finally, the PBX intercept CPU effects a connection in the trunk interface between the incoming CO trunk and the dedicated outgoing PBX communication line, whereby the calling party is placed in communication with the called party.

According to the principles of the present invention, the interaction of the PBX intercept system allows the information and responses of the caller to be fully utilized before resort is had, if any, to a switchboard attendant for assistance. This both decreases the time in which incoming calls are completed and also reduces the workload of the attendant so more time can be devoted to callers who have a bona fide need for assistance. In this regard the PBX intercept system further includes means for selectively switching between operating modes including a full intercept mode in which all incoming calls are intercepted and connected through the switching matrix to the digital announcement circuit. A delayed intercept mode is also provided in which calls are passed through the intercept system to the on-premises Switching system until such time as the attendants cannot accommodate all such calls within a programmable period of time, whereupon the overflow calls are intercepted and the callers are given an opportunity to complete their own calls through the use of the intercept system. A third mode, the cut-through mode, allows all calls to be presented to PBX switchboard attendants notwithstanding the period of time calling parties must wait in order to be assisted by such attendants.

DESCRIPTION OF THE DRAWINGS

FIGS. 7 through 14 comprise flow charts of the various call states through which the PBX intercept system progresses in carrying out its intended function.

DESCRIPTION OF THE PRIOR ART

In order that the present invention may be more fully appreciated, it will be instructive to first review briefly the structure and operation of an attendant-served PBX switching 16 coupled to a central office switching system 12.

Figure 1:
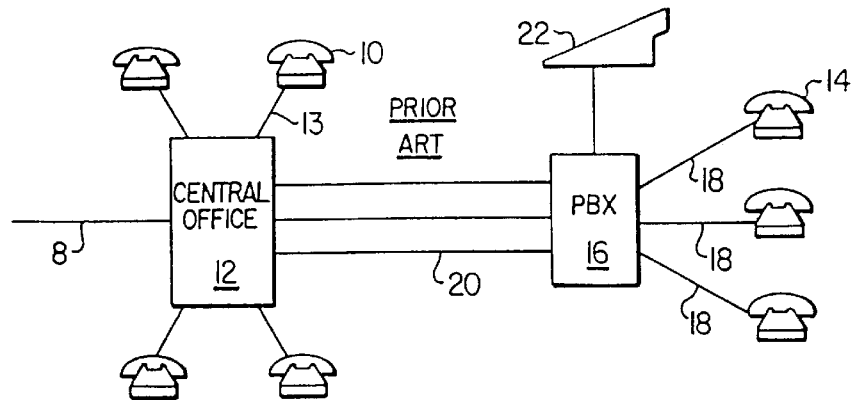
FIG. 1 of the drawings illustrates the well-known arrangement of an attendant-served PBX switching system and an exemplary central office switching system.

Turning now to FIG. 1 of the drawings there is shown a conventional arrangement for providing telecommunication service between a calling party 10 served by a central office switching system 12, and a called party 14 to whom the calling party wishes to speak, where the called party is served by an attendant 22 equipped private branch exchange switching system (PBX) 16. The telephone set of the calling party 10 is connected to the central office 12 by subscriber lines 13, and the extension set of the called party 14 is connected to the PBX 16 by extension lines 18. A plurality of trunks, one designated as reference character 20, is provided between the central office 12 and the PBX 16 for carrying two-way voice communications therebetween. Communication service may be switched by the central office 12 to trunks 20 from interoffice trunks 8, as well as from CO subscriber lines 13.

PBX switching systems are tailored to provide telecommunications service for business concerns, office buildings and the like, and are generally located on the premises of the parties serviced thereby. Unless the PBX 16 is provided with direct inward station dialing equipment, or is connected to a central office or other switching facility by a specialized line, such as a DID trunk, incoming telephone calls directed toward the PBX 16 must be first intercepted by a switchboard attendant through a switchboard console 22 and then routed through the PBX to the called party 14.

In the majority of instances where the on-premises PBX switching systems 16 are connected to central offices by non-specialized trunks 20, the calling party dials destination determining information (a seven-digit directory number) into the central office 12, whereupon the central office decodes this directory number as specifically identifying the business concern associated with the PBX 16. The central office 12 transmits a ringing current over one of the trunks 20 to the PBX 16, and/or grounds the tip conductor as an indication that service of the PBX 16 is requested. Since the only signal received by the PBX 16 is a ringing current, the on-premises system is not able to discern exactly which PBX telephone to connect to the incoming trunk 20. Therefore, the PBX 16 connects the trunk 20 requesting service to the attendant console 22, and a communication path between the calling party 10 and the attendant 22 is established so that the attendant can speak with the calling party and learn exactly which telephone extension is associated with the person to whom the calling party wishes to speak. When the calling party orally communicates the called party's name or associated extension number to the attendant 22, the attendant dials the pertinent extension number into the PBX 16. As a result, the desired telephone extension 14 is connected to the incoming trunk requesting service and a communication path is thus established between the calling party 10 and the called party 14.

From the foregoing, it is seen that unless a specialized DID trunk is utilized between the central office 12 and the PBX 16, the intervention of the attendant 22 is a necessity in completing the connection of outside calling parties to the desired station sets 14 of the PBX 16. This is the case even though the outside calling party knows the extension number representative of the telephone extension set 14. Because a PBX 16 which is connected to non-specialized trunks does not recognize dialing thereon, nothing would be benefited by the calling party 10 dialing the extension number of the called party to whom he wishes to communicate.

DETAILED DESCRIPTION OF THE PREFERRED EMBODIMENT

Figure 2:
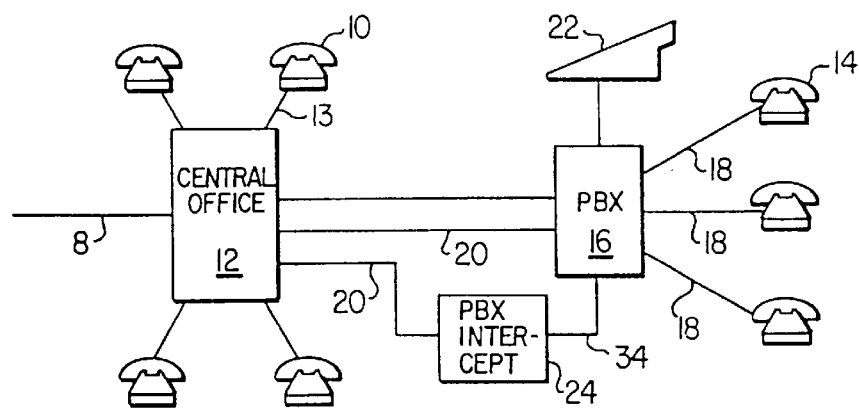
FIG. 2 illustrates the connecting arrangement of the PBX switching system of FIG. 1 with the central office employing the present invention.

FIG. 2 illustrates an environment in which the present invention may be advantageously employed. The PBX intercept system 24 according to the principles of the present invention is shown in FIG. 2 with an input connected to the central office 12 by a non-specialized trunk 20, and an output connected to the PBX 16 by a communication line 34. As will be set forth in more detail below, a station line 18 is used as the interconnecting communication line 34 in one mode of operation, however a tie trunk, on-premises extension line, or a DID trunk may also be used as the communication line between the intercept system 24 and the on-premises switching system 16. In fact, certain additional advantages, to be discussed below, are to be gained by the use of the present invention when the communication line 34 is a DID trunk.

The present invention in the one mode is thus connected to the PBX 16 by a standard station line, the on-premises PBX equipment is adapted to receive extension number dialing information over such a line and appropriately provide a switched communication path between the line and the desired PBX telephone extension. For all practical purposes and in this mode, the PBX switching system 16 sees the intercept equipment 24 as another telephone extension from which destination determining information is received, and in accordance therewith, a communication path is established to the desired telephone extension. To that end, the PBX intercept system 24 is easily adapted to conventional PBX switching systems with no software or hardware modification to the switching systems. Insofar as the attendants 22 or the called parties 14 are concerned, the PBX intercept system 24 is completely transparent. By this it is meant that in effecting communication paths the attendants and the called parties are unaware of the intervention of the intercept system 24.

As seen in FIG. 2 the intercept system 24 is connected to the PBX 16 by one or more of the PBX communication lines 34, and is connected to the central office 12 by a corresponding number of non-specialized trunks 20. While the preferred embodiment of the invention will be described in connection for use with a PBX switching system, it should be understood that the invention can be used with equal utility and effectiveness with key telephone systems, and other similar on-premises switching systems. In a broad sense, the invention may effectively be connected between multiple telephone switching systems so as to provide the calling party with an instructional message which, for example, gives the party the option of electing a destination.

Figure 3:
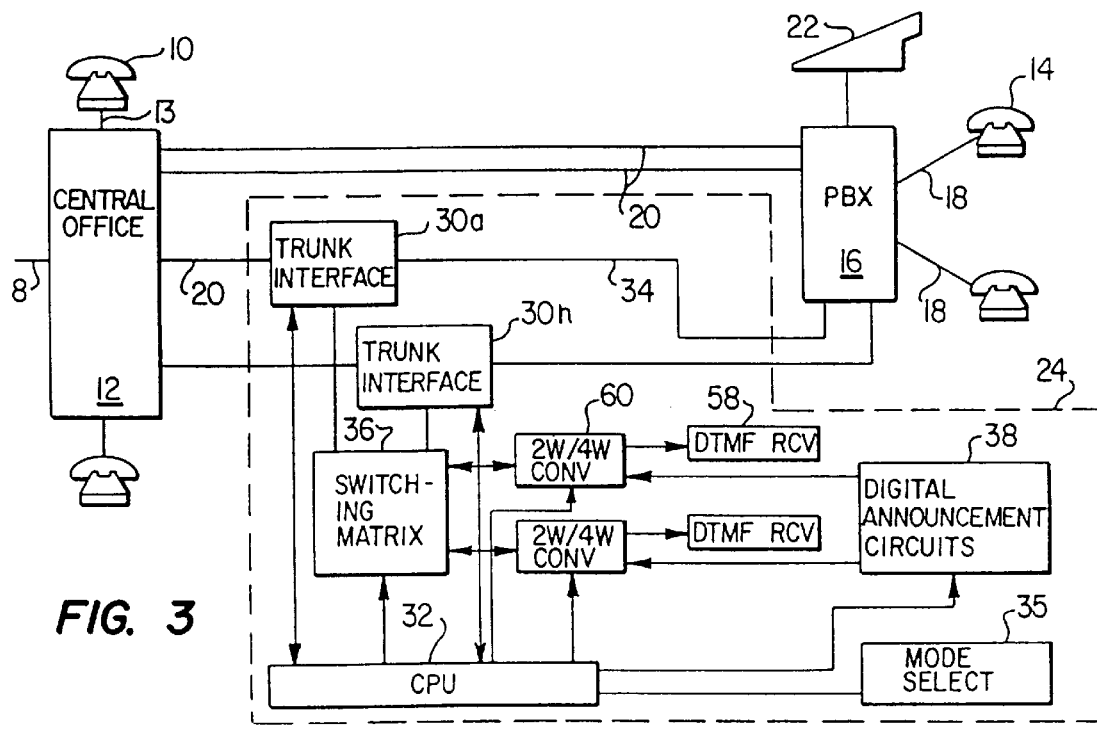
FIG. 3 is a simplified functional block diagram of the present invention interconnected between the central office switching system and the attendant-served PBX switching system of FIG. 2.

FIG. 3 is a more detailed diagram of the PBX intercept system 24 showing the major functional features in block form. Particularly, the intercept system 24 includes a trunk interface 30a for interfacing each non-specialized CO trunk 20 with a corresponding PBX communication line 34. As will be described in more detail below, the trunk interface 30a includes circuitry for detecting requests for service in the nature of ringing signals or tip conductor grounds on the trunk 20.

A CPU 32 is connected (as shown in dashed lines) to those parts of the invention represented by the functional blocks of FIG. 3. In this manner the CPU 32 can sense or monitor the system operation and control the sequence of events to accomplish the overall purpose of the intercept system. As will also be discussed in greater detail below, the software architecture of the present invention is designed to associate the various steps of a call with a "state" which is changed by the CPU 32 as the call progresses to completion.

The operational mode of the intercept system 24 is controlled by a "mode select" means, shown generally as reference character 35 in FIG. 3. In the preferred form, the mode select means 35 is comprised of a mechanical switch with a number of outputs corresponding to each of the system modes, namely, the full intercept mode, the delayed intercept mode and the cut-through mode. Each switch output is coupled to the CPU 32, and the switch output on which a voltage appears provides the indication of the mode in which the intercept system 24 should be operating.

In addition, the "mode select" means includes a software routine which can overide the switch and which is responsive to the receipt of a special set of digits from the trunk input of the intercept system for placing the system in one of the three exemplary modes of operation. There is provided three such sets of special digits, each such set being associated with one of the modes. A more detailed description of the software mode select means is set forth later in this description.

Full Intercept Mode

The PBX intercept system will be described first in connection with its capability to intercept all incoming calls irrespective of the availability of switchboard attendants. Next will be discussed the invention with regard to its structure to intercept only attendant overflow calls, and lastly its capability to cut all calls through to the on-premises switchboard attendants.

With reference then to FIG. 3, when the CPU 32 senses a request for service on one of the trunks 20 a search for an idle DTMF receiver 58 is conducted and the selected receiver is connected by the CPU 32 to the trunk through an analog switching matrix 36. With the analog switching matrix 36 the CPU can connect any one of the plurality of DTMF receivers 58 to any one of the non-specialized CO trunks 20 to thereby collect dialing information from the calling party 10. To be discussed in more detail below, the CPU 32 makes this switched connection approximately ¼ second before the beginning of the message.

Up to this point in the call sequence neither the calling party 10 nor the central office 12 is aware, nor need be aware, of the existence of the PBX intercept 24 associated with the PBX switching system 16. After the PBX intercept 24 has recognized a request for service, the CPU 32 appropriately connects a digital announcement circuit 38 to the trunk interface 30a through the analog switching matrix 36 so as to be in communication with the calling party 10. Without delay, an announcement message is then transmitted to the caller and advises the caller of the name of the business concern that has been reached, and further advises with an instructional message inviting the caller to dial the extension number of the desired extension telephone through which he desires to communicate with the called party. According to this announcement message, the calling party can then dial the telephone extension number which number is collected by the selected DTMF receiver 58 and sensed by the CPU 32.

With the signaling circuits in the trunk interface 30a the CPU 32 seizes a PBX communication line 34 and requests service from the PBX 16. Through conventional signaling techniques the PBX switching system 16 recognizes a request for service on communication line 34, and in return signals the intercept system 24 with an acknowledgment. Upon recognition of this return signaling the CPU 32 outpulses the dialing information previously received from the calling party, to the PBX 16 over the seized communication line 34.

The PBX switching system 16 then utilizes the dialing information to provide a switched communication path between the called station set 14 and the communication line 34 dedicated to the intercept system 24. Simultaneously, the CPU 32 connects the communication line 34 to the CO trunk 20 to thus effect a communication path between the calling party 10 and the called party 14. It is seen that with the provision of the PBX intercept 24 the assistance of the PBX operator or attendant 22 is in many instances eliminated. In doing so, information from the calling party has been solicited and utilized to the fullest extent such that PBX operator assistance is no longer required, at least when in the full intercept mode and when the calling party knows the extension number of the party to be called.

In establishing the initial communication path between the calling party 10 and the digital announcement circuit 38, it should be understood that the speech connection in the analog switching matrix 36 is bi-directional. With this arrangement while the calling party is listening to the instructional message he may simultaneously dial the PBX extension number wherein it is then received and stored by the DTMF receiver 58. Upon detecting the first dialed digit, the CPU 32 disconnects the message transmission directed to the calling party. This aspect is especially advantageous to callers who are aware, or recognize the existence of the PBX intercept system and thus are able to expedite their call by dialing the PBX extension number even before the instructional message has been fully transmitted. According to the principles of the present invention there is also accounted for those instances in which the calling party does not know or does not remember the telephone extension number of the party to whom he wishes to speak.

Accordingly, in this latter instance the instructional message stored in the digital announcement circuit 38 continues the message with dialogue which instructs the caller to dial the PBX attendant number (generally "0") in the event the extension number is not known and assistance is required by the attendant. The exemplary message contains yet other dialogue which notifies the calling party 10 that if he desires to wait for a short period of time the operator 22 will be automatically connected to assist in completing the call. If, after the message has been transmitted and no dialing information has been received, the CPU 32 assumes that no such information will be forthcoming. After a predetermined period of time the PBX intercept system 24 will automatically outpulse the attendant's 22 extension number to the PBX 16 so that the calling party 10 will thereby be assisted. With this arrangement, the attendant 22 can communicate with the calling party 10 and search the directory for the called party's directory number, and then dial such number into the PBX switching system 16. A communication path is then completed between the calling party 10 and the called party 14.

While the outpulsing of the attendant's telephone number (as a last resort) is described in the illustrated example, it is well within the ambit of the invention to outpulse other programmed telephone numbers for assistance, such as a guard station after hours, or the telephone number of a person who may occasionally assume the operator's responsibilities. Also, upon recognizing the dialing of "0" by the calling party, the PBX intercept 24 has the capability of outpulsing, for example, a four-digit extension number which truly identifies the attendant console 22.

Delayed Intercept Mode

Having described the basic operational principles of the invention when used to intercept all incoming calls, i.e., the full intercept mode, the description will proceed next when the invention is used in the delay intercept mode. In this mode all incoming calls from the CO are first offered to the PBX attendant 22, and those calls which cannot be accommodated by the attendant within a programmable period of time are intercepted and processed by the PBX intercept system 24. Because answer supervision from the PBX 16 is required in the remaining two modes of operation, a DID type of trunk can be employed as the communication line 34 between the intercept equipment 24 and the PBX 16 to satisfy the signaling requirement. When the delayed intercept mode is selected by the mode select circuit 35 the intercept equipment 24 seizes an idle PBX communication line 34, requests service from the PBX in the standard manner, and then dials the PBX attendant's telephone number. It should be noted that the communications between the intercept equipment 24 and the PBX switching system 16 are of the format and type which are well known in the telephony art. In the preferred embodiment, the invention recognizes that differences in transmission formats must be accounted for depending on whether the PBX communication line 34 is a DID trunk, station line or off-premises extension line. Many of the standard protocols used in the telephony art are described in more detail in the Electronics Industry Associations Standard RS-464 Private Branch Exchange (PBX) Switching Equipment for Voiceband Applications.

Returning to the delay intercept mode it should be noted that at this point neither the calling party 10 nor the central office equipment 12 has been signaled that the PBX intercept equipment 24 has originated a call to the PBX 16 on line 34. In fact, the PBX intercept equipment 24 has not yet transmitted an answer signal to the central office on trunk 20, and thus the calling party 10 will continue to hear ringing supplied on CO line 13 by the central office 12. Thus, at this stage of the call the calling party would believe that the ringing signal is that signal which is alerting the attendant 22. In this respect the PBX intercept 24 operations are entirely transparent to the calling party 10.

Concurrent with the calling party CO audible ringing, the PBX intercept 24 sends signals to the PBX so that the PBX attendant 22 is rung. The attendant 22 responds to the incoming call as if it originated from the central office 12, and in this regard the intercept equipment 24 appears transparent to the attendant 22.

After the CPU 32 has made the appropriate interconnections within the trunk interface 30a so that the dialed number can be outpulsed on communication line 34 to the PBX 16, the CPU initiates a software timer to determine if the call will be answered by the attendant within a predetermined period of time. If the call is answered by the attendant 22 within this predetermined period of time, the PBX will send a standard answer signal to the intercept equipment 24 on the line 34. Upon recognizing the standard answer signal, the PBX intercept 24 will make the appropriate interconnections in the trunk interface 30 for sending a corresponding answer signal to the central office 12. The central office 12 in turn disconnects ringing to the calling party 10 and provides a talking path between the CO line 13 and trunk 20 to the PBX intercept 24. The PBX intercept CPU 32 will also provide a connection through the trunk interface 30a, thereby establishing a talking path between the CO trunk 20 and the PBX line 34 and completing the communication path between the calling party 10 and the PBX operator 22.

Upon being told by the calling party of the PBX telephone extension to be rung, the attendant 22 will dial the telephone extension number into the PBX, whereupon the called party 14 will be rung by the PBX 16 to alert the called party of an incoming call. In a standard manner, when the called party 14 answers the extension, the PBX 16 will establish the last link of the communication path between the PBX intercept 24 and the PBX communication line 34, thereby placing the calling party 10 and the called party 14 in communications together.

It is to be noted again that this delayed intercept mode as described thus far depends on the PBX communication line 34 being of the type in which the PBX 16 will provide a standard answer signal to the intercept equipment 24 when either the PBX attendant 22 or the called party 14 responds to a call by going off-hook.

In the event the PBX attendant 22 is busy with other calls, the incoming call from the calling party 10 may not be answered in the predetermined period of time. The attendant may, for example, be responding to other calls from the central office 12, other PBX intercept equipment lines or the extension telephones connected to the PBX 16 itself. When the standard answer signal from the PBX 16 has not been received within this predetermined period of time the CPU 32 intercepts the call by disconnecting it from the PBX 16 and connecting the call through the trunk interface 30a to the digital announcement circuit 38. The PBX intercept 24 then completes the illustrated call in the delay intercept mode in the manner described above in connection with the full intercept mode.

As distinguished from equipment commonly known as "sequencers," the PBX intercept not only provides the unserviced callers with a recorded message, but also provides them with a means by which to by-pass the attendants and complete their calls if the called party's extension numbers are known to the callers. In accordance with the invention, the number of unserviced callers need not simply wait for an attendant to become available, but are given the option to complete their calls if they are able to dial the called party's extension number. This aspect of the invention not only relieves the attendants of the burden of trying to answer calls too quickly, and many times in an impolite manner, but also prevents callers from waiting too long and hanging up.

In brief summary then, the present invention, when operating in the delayed intercept mode, initiates a timer when ringing the PBX attendant 22, and then connects the calling party 10 to the digital announcement circuit 38 if the attendant 22 has not answered the calling party 10 within the specified period of time, as determined by the timer. The caller is then allowed the opportunity of completing his own call in response to the instructional message.

Cut-Through Mode

In the cut-through mode, the PBX intercept 24 programs the timer to a time which is so long that it is assured the attendant 22 will answer the call, or the caller will abandon the call before it is serviced by an attendant. In this manner, all incoming calls will obtain the benefit of personalized service when subsequently assisted by the switchboard attendants 22.

The three modes of operations described above provide an ability in which the PBX intercept 24 can be tailored to meet the needs of a business operation, as such needs may change from day to day. For example, a business operation may desire to provide their business callers with the personalized service of an attendant. Accordingly, during those hours of the day when the attendant or attendants on duty can respond to incoming calls in a timely manner the CPU is switched to operate in the cut-through mode. When, on the other hand, it is known that the peak calling hours occur during the day or in the heavy traffic seasons, the CPU 32 is switched to operate in the intercept delay mode so that most of the calls will be answered in a personalized manner and the remaining calls will be intercepted so as to avoid situations in which callers may have to wait too long and thus will hang up. After office hours, or during times when attendants are not on duty, the PBX intercept 24 may be programmed to operate in the full intercept mode in which event all calls are intercepted. In this last situation, a guard station, or similarly designated telephone may be rung as a last resort for assistance in the event the calling party is unaware of the called party's extension number. Special advantages may be realized in the full intercept mode since callers can be connected directly to pertinent departments within the business operation by simply following the dialing instructions of the instructional message, rather than dialing specific extension numbers.

Exemplary System Hardware

Figure 4:
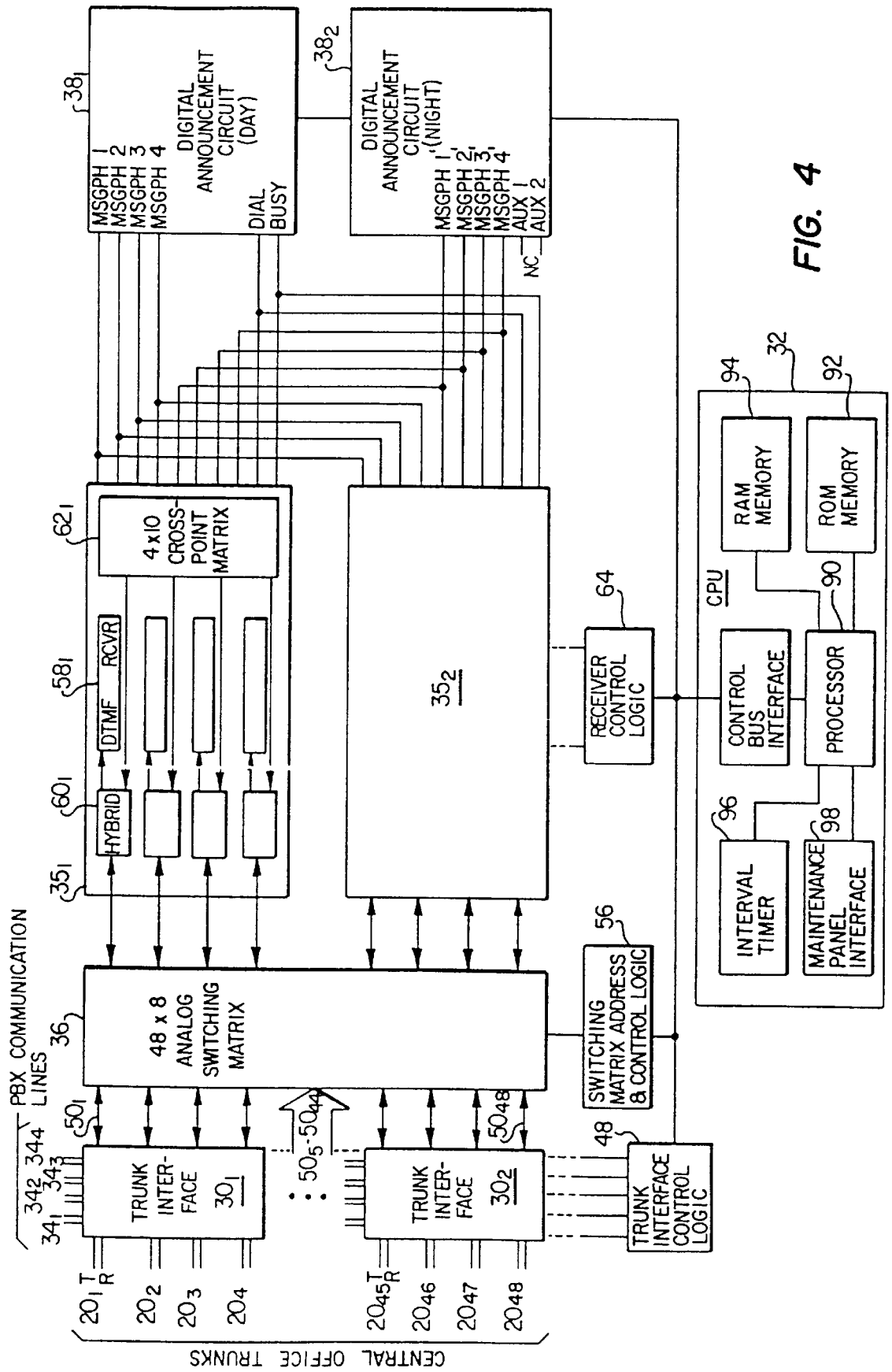
FIG. 4 is a more detailed block diagram of the PBX intercept system according to the preferred embodiment of the present invention.
Figure 5:
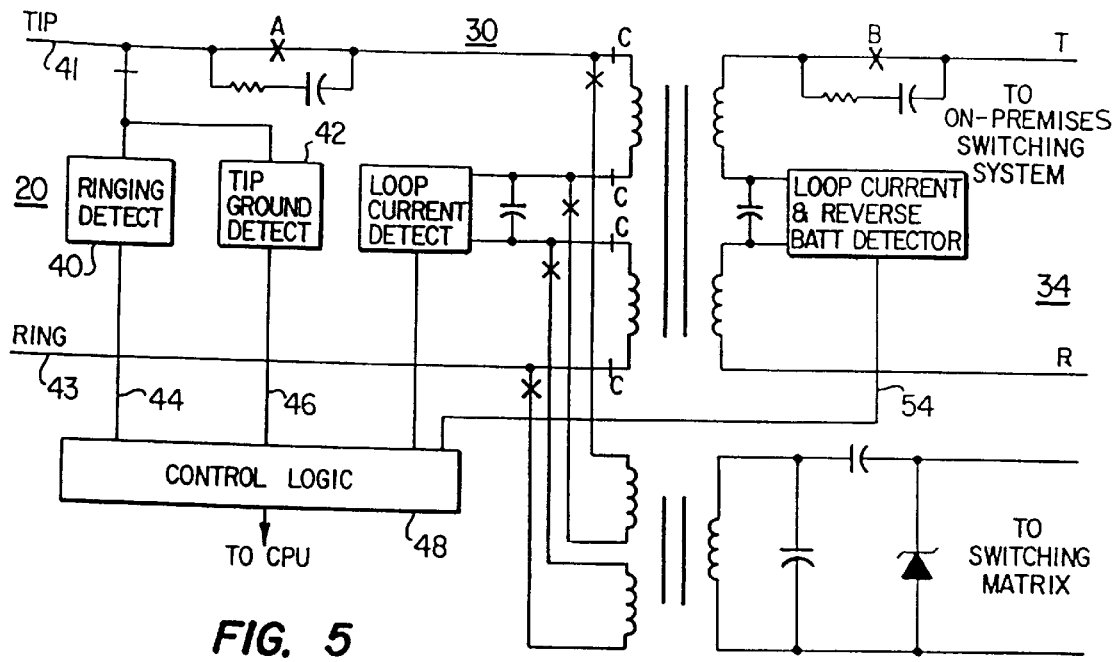
FIG. 5 is an electrical diagram of the three port trunk interface circuit.

Having described the basic operational principles of the PBX intercept system 24, attention is now directed to FIGS. 4 and 5 for a detailed description of the apparatus according to the invention. Whilesome of the functional parts of the PBX intercept 24 are well known in the telecommunications art, and a further detailed discussion would only encumber the description hereof, the PBX intercept 24 utilizes a unique arrangement of the components to accomplish the new results discussed herein.

According to the preferred embodiment of the PBX intercept 24 there is provided a three-port trunk interface circuit 30a as shown in FIG. 5. The trunk interface 30a includes an input port connected to the CO non-specialized trunk 20, and is transformer coupled to a second port extending toward the PBX switching system 16. A third port is provided through which communications are effected to the PBX intercept 24 itself. Each of the three ports is capable of passing bi-directional voice signals, as well as DTMF dialing information. While the present invention will be described in connection with the use of DTMF signals, conventional dial pulse signals with dial pulse receivers may be used with equal advantage. It is also envisioned that with the advent of speech recognition systems, one or more DTMF receivers could be replaced with such a system to translate speech signals into dialing information.

The illustrated trunk interface includes a ringing detect circuit 40 for detecting ringing requests for service, and a ground detect circuit 42 for detecting grounded tip conductor 41 requests for service. Each such circuit includes a monitor and control conductor 44 and 46 coupled to a control logic circuit 48 which serves as an interface to the CPU 32. The control logic circuit 48 controls the operation of relays A, B and C, the contacts of which are switchable to appropriately direct input and output signals to desired destinations. Specifically, the unoperated state of relay A allows ringing current on the ring conductor 43 to pass through the ring detect circuit 40 where ringing current is detected. Similarly, signaling from a central office to the PBX intercept on a ground start type trunk is accomplished by coupling the ground to the tip conductor ground detector through normally closed A contact. Either indication of a request for service is coupled to the CPU 32 by appropriate monitor points in the control logic circuit 48.

When in the full intercept mode, and when a request for service, such as ringing on the trunk ring conductor 43, is sensed by the CPU 32, relay A is operated to trip ringing. Relay C is also operated to provide a communication path between the calling party 10 and the switching matrix 36.

At this stage the message is sent to the calling party, and in response thereto the party 10 may dial a PBX extension number. Upon receiving the first digit of a dialed number, the CPU 32 disconnects the message from the calling party. After conventional validity checks are conducted on the dialed number as a whole, the digits are sent to the PBX switching system 16, relay C is released, and relay B is operated to establish a communication path between the CO 12 and the PBX 16. Loop current flowing from the CO 12 through the trunk interface 30a (FIG. 5) is detected by the CO as an indication that audible ringing to the calling party should be terminated.

When the PBX intercept CPU 32 is operated in the delayed intercept mode, a request for service on the trunk ring conductor 43 is sensed by the CPU 32, relay B is caused to be operated, while relay C is left in the unoperated state. The operation of relay B signals the PBX switching system 16 that a request for service on the associated communication line 34 is present. A signal such as a wink (on a wink start type DID trunk) is received from the PBX switching system 16, and is detected by the PBX intercept CPU 32 as an indication that the PBX 16 is ready to receive a transmission of the dial digits on the line. If, on the other hand, the PBX does not provide for such signaling on the interconnecting line 34, the PBX intercept 24 will outpulse the digits after a predetermined interval of time sufficient to allow the PBX 16 to prepare itself to receive digits. Outpulsing of the digits by the PBX intercept 24 is accomplished by the CPU 32 causing the B relay to release and operate according to the known digital and interdigital dial pulse intervals common to the rotary dial format.

An answer signal indicating that the PBX attendant has answered the call associated with the outpulsed digits is detected by the PBX intercept CPU 32, whereupon relay A is operated to transfer a corresponding answer signal to the central office 12. In addition, relay C is operated to provide talking path from the central office 12 to the PBX 16 by corresponding trunk and line 20 and 34.

In the event an answer signal from the PBX switching system 16 is not received by the CPU 32 before the earlier-mentioned timer times out, the CPU 32 will search for an idle DTMF receiver 58 and the next message phase of the digital announcement circuit 38 which is about to become active. When a DTMF receiver 58 and a message phase are available, the CPU 32 will release relay B and disconnect the previously dialed call to the PBX attendant 22, and will begin to process the incoming call on the central office trunk 20 in the same manner as in the mode where all calls are intercepted. It should be noted that at this point the central office 12 is yet sending ringing current to the intercept equipment 24, and the calling party 10 is still receiving audible ring tone as the intercept equipment 24 has not yet indicated an answer to the call.

From the foregoing it is seen that the CPU 32 is effective in sensing requests for service from either the central office 12 or the PBX switching system 16, and controlling switched paths within the trunk interface 30a to accomplish a desired communication path between the three ports. Each trunk interface 30a–30n includes the structure shown in FIG. 5. However, various different trunk interfaces may be used together in the PBX intercept equipment 24 to accommodate various types of signalling arrangements between the central office 12 and the PBX switching system 16. Significantly, each incoming CO trunk is uniquely associated with, and switched to a dedicated PBX communication line 34.

It is seen then that the structure of the trunk interface 30a greatly facilitates the signalling and communication flow between the PBX intercept 24, the PBX 16 and central office 12 switching systems. The arrows that appear on the communication busses indicate the direction of information flow on that bus.

In the preferred embodiment of the invention the analog switching network 36 includes a plurality of solid state crosspoint chips for connecting any one of its plurality of trunk interface inputs to any one of the dial information receivers 58. Switching paths within the analog switching network 36 are set up and removed under the control of the CPU 32 which sends address information to the address and control logic circuit 56. The address and control logic circuit 56 decodes the address information to determine if a connection is to be set up or removed, and also to determine exactly which trunk interface input is to be cross-connected to a desired idle DTMF receiver 58.

The CPU 32, being in overall control of the functions of the PBX intercept 24 establishes a connection in the analog switching network 36 from a CO trunk 20 requesting service to an idle DTMF receiver 58, and at the same time the CPU 32 operates the trunk interface A relay to trip ringing. The speech connection established in the analog switching network 36 to a particular DTMF receiver 58 effects a simultaneous one-way communication path to the DTMF receiver 58 and an oppositely directed one-way path to the digital announcement circuit 38 through a two-wire to four-wire hybrid circuit 60. The hybrid 60 in the preferred embodiment of the invention is comprised of a conventional electronic type of back-to-back hybrid. The two-wire to four-wire hybrid 60 provides for a bi-directional flow of information on its input side, and independent oppositely directed unidirectional flows of information on the other side. As seen in FIG. 4, analog information on the four-wire output side of the hybrid 60 is directed to the DTMF receiver 58, and analog instructional information is received from the digital announcement circuit 38.

In accordance with the invention, after ringing is tripped in the trunk interface 30a the connection in the analog switching network 36 establishes a communication path from the trunk 20 to the digital announcement circuit 38 through the two-wire to four-wire hybrid 60. After a communication path has been established between the hybrid 60 and the calling party 10, the CPU 32 issues a command to effect a transmission of an instructional message to the caller informing him of the identity of the business concern associated with the PBX, and a message soliciting from the calling party dialing information in the nature of the telephone extension number of the called party. This is accomplished in the following manner.

The digital announcement circuit 38, in conjunction with the 4×10 crosspoint matrix 62, is controlled by the CPU 32 to connect one of the messages which is digitally stored in the announcement circuit 38, and to direct the message to a desired two-wire to four-wire hybrid 60 and thus to a party calling over one of the CO trunks 20. Each block 35 of four DTMF receivers 58, and associated hybrids 60 includes a respective crosspoint matrix $62_1$ or $62_2$ each with four inputs switchable to any one of the ten outputs. The output terminals of crosspoint matrix $62_1$ are connected in parallel to the output terminals of matrix $62_2$ so that each such matrix can receive any message or signal produceable by the digital announcement circuit 38.

Digital announcement circuits $38_1$ and $38_2$ digitally store messages in the continuously variable slope delta modulation format. As will be discussed in more detail with FIG. 6, each digital announcement circuit $38_1$ and $38_2$ stores one complete message which is processed and output on terminals MSGPh1–MSGPh4 as four twenty-four second messages each skewed by six seconds. In this manner the beginning of a 24 second message is available to the calling party every six seconds. The message in announcement circuit $38_1$ includes, for example, a message useful for daytime instructions. Such a message may be "Thank you for calling Dytel Corporation, if you are dialing from a push button phone you may dial your party's telephone extension number during this message. If you need assistance please wait and an operator will help you. For sales you may dial 1, or marketing 2." Of course, other pertinent messages may be used to suit the desired needs of the user.

Digital announcement circuit $38_1$, includes a dial tone and busy tone which are also selectable by each crosspoint matrix $62_1$ and $62_2$. Digital announcement circuit $38_2$ has two optional outputs for auxiliary tones, if desired.

The receiver control logic 64 couples and decodes CPU commands directed to the dial information receiver blocks 35 to provide coordinated crossconnects between the hybrids 60 and the announcement circuits 38. It should be understood that the four ports of each crosspoint matrix $62_1$ and $62_2$ may be simultaneously connected to any of the ten ports on the other side of the matrix. In fact, any two or more of the two-wire to four-wire hybrids 60 may be simultaneously crossconnected to the same matrix port to receive the message next starting at the next skewed interval of time.

Figures 6A, 6C:
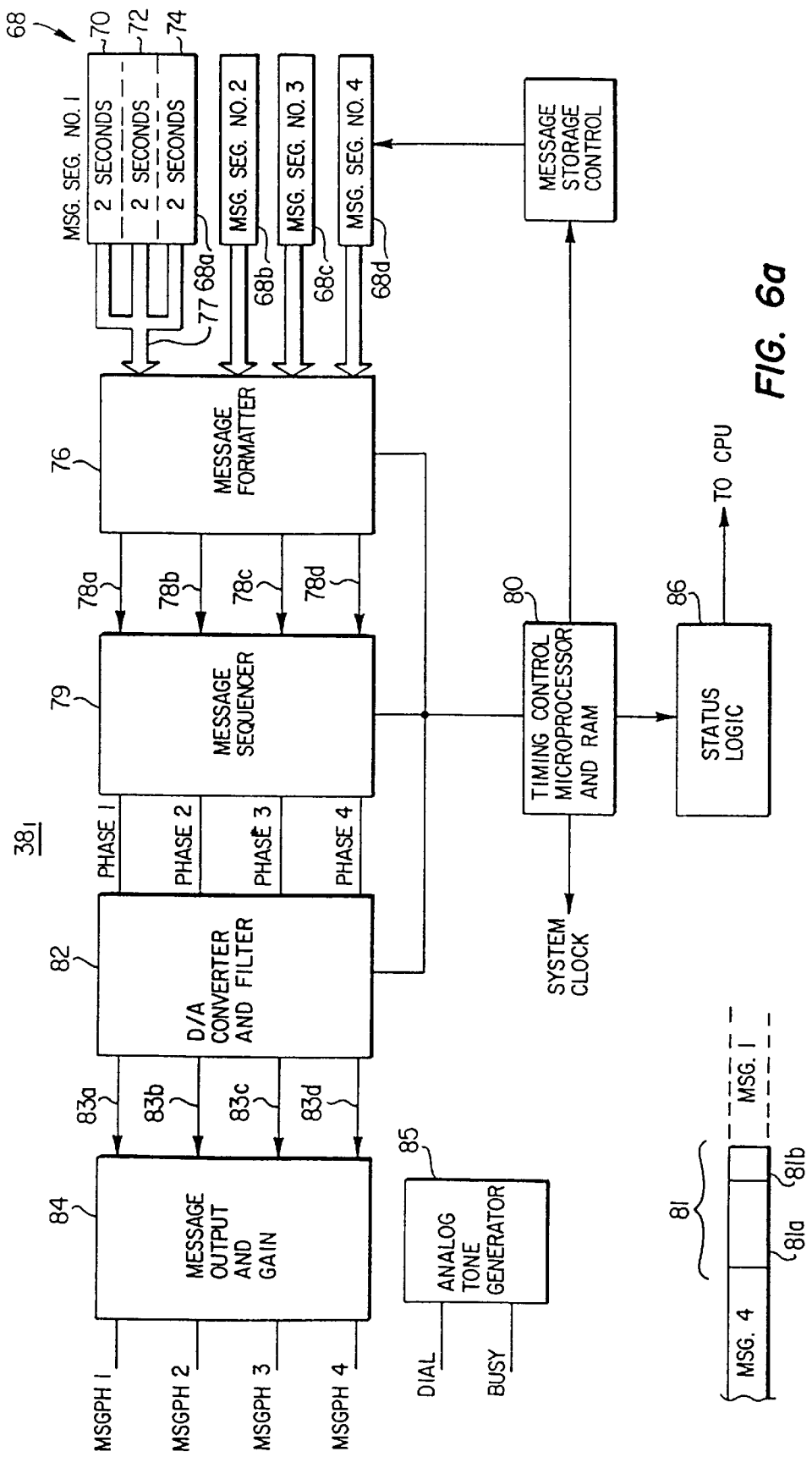
FIGS. 6a–6d are block diagrams and phase diagrams illustrating the generation of skewed instructional messages from the single digital message storage source.
Figure 6B:
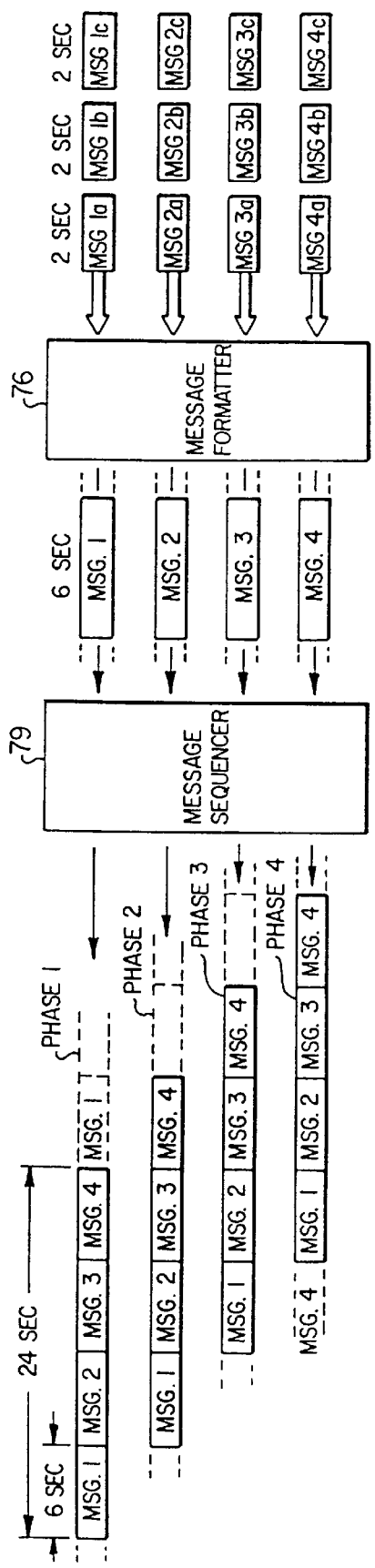

With reference now to FIG. 6a, together with FIG. 6b, there is illustrated in detail the digital announcement circuit $38_1$. FIG. 6a shows the structural composition of the digital announcement circuit $38_1$, while FIG. 6b represents the various message segments which are arranged from a plurality of rudimentary two-second message intervals, and combined into four resultant twenty-four second skewed messages. The vertical positions of the various messages show the time-relatedness of the messages. It should be realized that the announcement circuit $38_2$ functions similarly as that of $38_1$, but is distinguished therefrom only by the message content of the memories.

The instructional message noted above is stored in a message storage unit 68 of the digital announcement circuit $38_1$. In the preferred embodiment, the message storage unit 68 has a capacity to store approximately twenty-four seconds of digital instructional message information, and is divided into four equal six-second message segments 68a, 68b, 68c and 68d. The serial combination of each six-second message segment results in a continuous twenty-four second message. However, for other applications messages of different lengths can be accommodated by adding or subtracting the number of message segments, or by changing the message length of each such segment.

Each message segment 68a–68d is comprised of three 8 K×8 EPROMs (eraseable programmable read only memories) with a total capacity of 24 K bytes. As will be discussed more fully below, the message information stored within each message segment 68a–68d is retrieved from each such memory segment, and serialized into a six-second message segment by a message formatter 76. The message formatter 76 includes circuitry for reading each of the memories of each message segment 68a–68d, and for serializing the information of each message segment with standard parallel-to-serial converters (not shown). The message formatter 76 is essentially comprised of four identical circuits for processing each message segment 68a–68d independently. The individual memories of the message storage unit 68 are coupled to the message formatter 76 by parallel address and data buses, one such multi-wire bus designated as reference character 77. Address information from the message formatter 76 is transmitted on the bus 77 to message segment No. 1 (MSG. 1) 68a, and the message data read therefrom is transmitted back on bus 77 to the message formatter 76 for serializing.

In the preferred embodiment of the invention, the instructional message is stored in the message storage unit 68 in a delta modulation format. Other formats, such as a PCM mode may of course be employed.

As noted above, the message storage unit 68 has the capacity for storing a twenty-four second message. Furthermore, the message is divided into segments with segment No. 1 68a holding the first six-second portion of the instructional message. Moreover, message segment No. 1 68a includes storage memories 70, 72 and 74 each of which stores two seconds of the six-second message comprising that message segment. Message segments 68b–68d are comparably constructed. To develop this twenty-four second message, the message formatter 76 simultaneously addresses one EPROM (such as EPROM 70 in segment No. 1) of each of the message segments 68a–68d to obtain the two-second message stored within each such segment. The next EPROM of each message segment, for example EPROM 72 of message segment 68a, is addressed and appended to the previous two-second message retrieved from that respective message segment. Similarly, the third EPROM (EPROM 74 of message segment 68a) of each segment 68a–68d is addressed to obtain the last two-second portion of the six-second message stored within that respective message segment.

Therefore, on each of the four input buses 77 to the message formatter 76 there repeatedly appears a six-second message which, when subsequently further combined, forms the twenty-four second message.

From the development of the single twenty-four second instructional message, the invention provides the four identical messages skewed in time such as shown on the left of FIG. 6b. This aspect of the invention is highly advantageous for two reasons. First, the calling party need not wait more than six seconds to receive the start of a twenty-four second instructional message, and secondly, only one complete twenty-four second message need be initially stored. While it is possible to store four twenty-four second messages (96 seconds of information), this approach has the obvious disadvantage of requiring four times as much memory storage area.

With the foregoing in mind, the output conductor 78a of the message formatter 76, cyclically repeats the first six seconds MSG. 1 (of the twenty-four second message) obtained from message segment 68a. In a similar manner, and in an aligned six-second time interval, the message formatter 76 provides on output conductor 78b a cyclical six-second message (MSG. 2) consisting of the seventh through twelveth second interval of the twenty-four second instructional message. In a similar manner, message formatter outputs 78c and 78d respectively carry the third and fourth six-second message (MSG. 3 and MSG. 4) intervals to thereby complete the twenty-four second instructional message. The four six-second message segments MSG. 1–MSG. 4 appear on parallel busses (FIG. 6b) and must be serialized together to form the twenty-four second message.

The digital announcement circuit $38_1$ additionally includes a message sequence circuit 79 for serializing the six-second message segments (MSG. 1–MSG. 4) together into four independent skewed twenty-four second messages as shown in FIG. 6b. At this juncture it should be noted that the digital announcement circuit $38_1$ is under the general control of a timing and control circuit 80. A system clock supplies the timing and control circuit 80 with 1.00 megahertz clock pulses. A timing and control circuit 80 generates 31.25 Khz pulses from the 1 Mhz clock pulses for use in digital to analog conversion. Because the various circuits of the digital announcement circuit 38 are all controlled with a standard time base 80, the addressing of the message storage unit 68 is coordinated so that each message segment 68a–68d is read to simultaneously develop the four six-second messages. The address timing is also coordinated so that the three EPROMs of each message segment 68a–68d are read in seriatim to produce an uninterrupted six-second message from the three two-second messages stored in each such memory element 70, 72 and 74.

In addition, the parallel to serial converters in the message formatter 76 are controlled by the 1.00 Mhz clock to receive data from the parallel buses of the memory storage unit 68 and convert it into serial data on four corresponding serial buses 78a–78d. The message sequencer 79 uses the system clock as a time base to serialize each of the four six-second message segments MSG. 1–MSG. 4 to form the twenty-four second message. Since each six-second message segment MSG. 1–MSG. 4 repetitively repeats every six seconds, the skewing circuitry merely needs to select MSG. 1 in the first six-second interval, MSG. 2 in the second six-second interval, MSG. 3 in the third interval, and MSG. 4 in the fourth interval, and chain the segments together. However, as shown in FIG. 6b, while, for example, MSG. 4 is selected in the fourth six-second interval for phase one, MSG. 3, MSG. 2 and MSG. 1 are simultaneoulsy selected in that same interval for the other respective phases 2, 3 and 4.

The timing and control circuit 80 generates at the end of each message segment a "message connect" bit so that the software can connect a desired message to one of the ten ports of the crosspoint matrix 62. Shown in FIG. 6C is the 250 millisecond interval shown in amplified form. As will be discussed in more detail below, the 250 millisecond period is provided to generate therein a message connect bit for signalling the CPU 32 such that it can effect a connection in the crosspoint matrix 62 between the message phases (MSG. 1–MSG. 4) which will next transmit the beginning of the message, and the CO trunk or trunks 20 which are originating new calls to the intercept equipment 24.

A status logic circuit 86 is connected to the timing and control circuit 80 and maintains the current status of the digital announcement circuit 38 to provide the CPU 32 with data concerning the next active message and the noted message connect bit. The information coupled from the status logic 86 to the CPU 32 is in the form of an 8-bit word including four bits identifying the next active message phase, and one bit which is active during the quiet period to indicate when crosspoint matrix 62 switching should be executed. In this manner the CPU coordinates the switching of the crosspoint matrix 62 and thus the various message phases so that the calling party obtains the immediately next occurring message phase. As noted previously, this feature of the invention eliminates either an unnecessarily long waiting period, or an excessively large storage area for holding a plurality of twenty-four second messages.

Proceeding now with FIG. 6a, the four skewed phases of the instructional message are processed by a digital-to-analog (D/A) converter and filter 82. The digital-to-analog converter processes each phase of the instructional message, and is comprised of a Motorola Codec integrated circuit of the 3418 type. This integrated circuit type typically converts the 8-bit digital words read from the message storage unit 68, into analog samples having an amplitude corresponding to the delta modulated digital word. Of course, other Codec chip types are available for decoding and converting PCM encoded digital words should that type of modulation format be used. The instructional message is read from memory at a rate of about 32 kbps to both reduce memory requirements and maintain a high quality of the audio message. As noted previously, the timing and control circuit 80 provides the appropriate timing pulses to accomplish this timing requirement.

A filter is also provided for integrating the analog samples and smoothing them into a continuous analog signal which is a representation of the instructional message initially stored in digital form in the message storage unit memories 68. Each such filter is an integrated circuit manufactured by Motorola, and identified as type 45414. Therefore, the output conductors 83a–83d of the D/A converter and filter 82 carry the respective four phases of the instructional message in analog voice form.

Each analog instructional message phase is then coupled from the D/A converter and filter 82 to a message output and gain circuit 84 which includes quad amplifier-drivers with programmable gain characteristics. The outputs MSGPh1–MSGPh4 of the message and gain circuit 84 of FIG. 6a are coupled to the crosspoint matrixes 62₁, and 62₂ of FIG. 4.

Figure 6D:
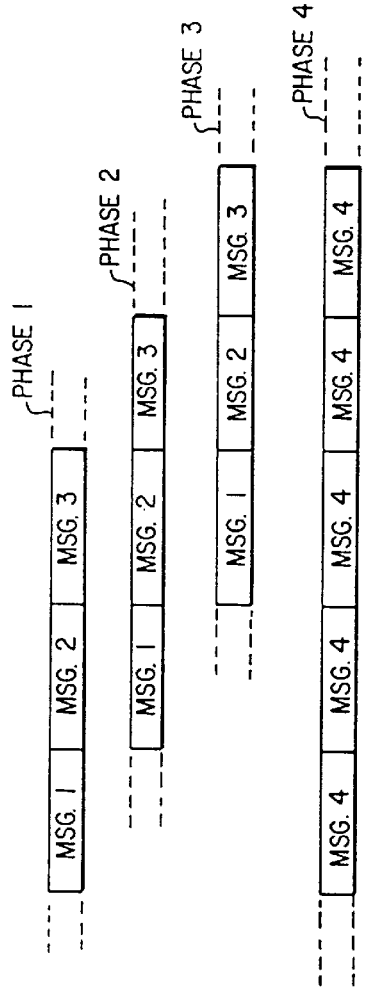

The digital announcement circuit is not limited, however, to the output format shown in FIG. 6b. An alternative output format is shown in FIG. 6d. The message formatter 76 includes a CPU (not shown) which has the capability of directing contents of the message memories to any one or more of the output terminals MSGPh1–MSGPh4. This allows considerable flexibility beyond the example shown in FIG. 6 and, in particular, beyond the message phase sequencing in FIG. 6b. By altering the sequence of accessing and serializing the message memory contents for sending out on the 4 phase terminals, many message segments could be stored in any sequence in the message memories and sent to the phases as needed. For example, MSGPh4 could be used for a continuously playing message of four seconds duration, and simultaneously use MSGPh1–MSGPh3 for a separate message of fourteen second duration which has phase relation between the phases much like that shown in FIG. 6b, but using only MSGPh1–MSGPh3, and also using only 3 message segments, 2 of which are 6 seconds long and one which is 2 seconds longs In a more complex example, the message memories could contain individual words or phrases which can be combined to produce complete sentences on the relevant phase or phases, as appropriate for the customer. Messages of more than 24 seconds could thus be constructed by using individual words or phrases more than one time in a message. The inherent capability to combine words and phrases can be seen by noting that the sequence of reading memory locations 68a–68d by the message formatter 76 is determined by a pattern encoded into programmable read only memory (PROM) within the formatter 76. Altering the reading sequence of memory locations 68a–68d by the message formatter 76 therefore can be accomplished by altering the read pattern encoded in the mentioned PROM.

Additionally provided with the digital announcement circuit 38₁ is an analog tone generator 85 which provides the dial tone and busy tone signals to the system via the 4×10 cross-point matrixes 62.

Exemplary System Software

Having described in detail the operation of the PBX intercept hardware, the sequence of steps as determined by the CPU program will next be described. The bottom of FIG. 4 is illustrative of the general architecture of the CPU 32 for achieving the objects of the invention. The processor 90 of the CPU is a microprocessor, such as the Zilog Z80A integrated circuit. The read only memory (ROM) 92 contains the instructions which are executed by the processor 90 to carry out the various functions of the PBX intercept equipment to accomplish the overall desired result. The random access memory (RAM) 94 provides the processor 90 with a scratch pad memory for storing transient information relating to the progress of a call in the system. The RAM 94 is sectioned into blocks of memory. denoted as Trunk Content Buffers (TCB) each of which are associated with an incoming central office trunk 20. Each TCB contains subfields of memory used to identify the state of a call, events which have occurred while a call is in a given state, the identity of the DTMF decoder 58 assigned to particular trunk interfaces, timing fields for counting various time intervals, and the number of times a message has been repeated to a calling party. Additional information, such as the current message phase, fault counts, and other information relevant to processing calls is kept in the TCB. The RAM memory 94 also includes a plurality of Receive Control Buffers (RCB's) for storing the dialed information received from the calling party, as well as subfields for storing the identity of the particular trunk interface through which dialed extension digits are received, and the number of digits received.

The events referred to in the previous paragraph which are stored in the TCB pertain to changes in condition relevant to the calls processed by the PBX intercept 24. Some examples of these conditions are, digit detection by a DTMF receiver 58, a call origination to the PBX intercept 24 by the central office 12 as indicated by a tip ground sensed by the tip ground detector 46 of a trunk interface 30a, or the expiration of a timer. These events indicate that something has occurred which should be considered in light of the call processing step in the sequence of operations in which a call has progressed (called the state of the call) when the event occurred. The combination of the event and the current state of the call are used together to determine what action or actions should be taken to process the call toward the next step in the sequence of steps as was discussed above, and also to determine the next state.

The interval timer 96 is connected to the interrupt input of the processor 90 and provides the processor with real time intervals of approximately ten milliseconds. While not essential to the operation of the PBX intercept 24, a maintenance panel interface 98 provides the ability of a craftsman to interrogate the system and determine the operational status or general health of the system.

The sequence of steps through which the present invention undergoes in performing its function is shown in FIGS. 7 through 14. As noted above, as an incoming call is processed by the PBX intercept 24 a series of states are assigned to the call as it progresses to completion. The program of the CPU 32 includes a base level executive program 100 (FIG. 7) from which the processor departs to execute a sequence of steps relating to a given state to which a call has been assigned. The base level program is generally designated 100 and it is that program to which the processor 90 is returned from the various other programs as depicted in FIGS. 7–14.

It should be understood at the outset of the program description that such description covers the basic operational steps only. From this description it will be evident to those skilled in the art how to structure each instruction of the program to accomplish the various described results. According to FIG. 7, from the base level program 100 the processor 90 proceeds to execute any I/O processing 102 for the maintenance panel. Then the processor 32 scans the above mentioned TCB's to determine if new events have occurred for any of the trunk interfaces. If any new events are discovered by this scan, then the processor 32 proceeds to function block 106 of the base level executive program where call sequencing operations are carried out, as shown more fully in FIGS. 9 through 14.

Figure 8:
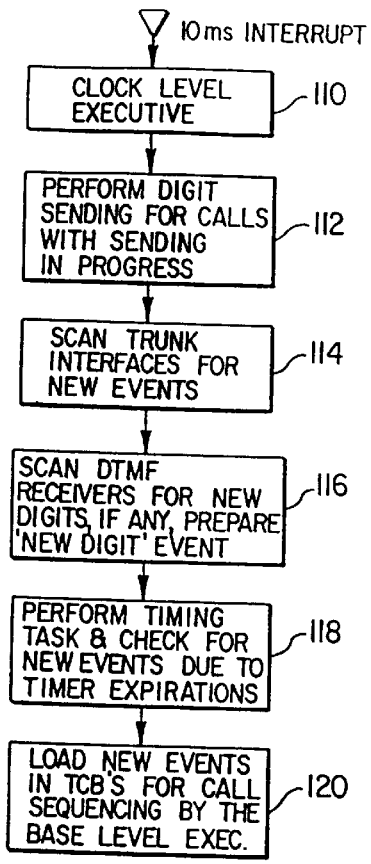
Figure 7:
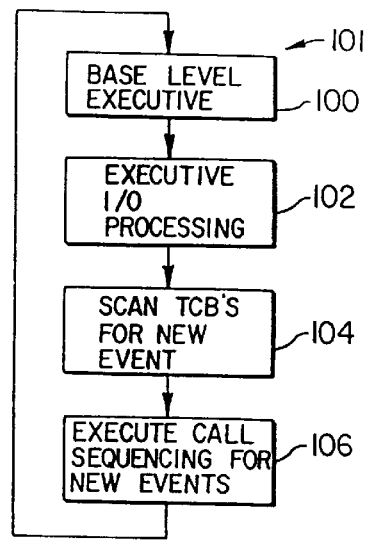

FIG. 8 depicts the clock level executive program 110 which is entered by the processor 90 every 10 milliseconds as determined by a signal on its interrupt input (not shown). The clock level executive program 110 performs tasks which require the need for timed intervals. Among these tasks is the performance of digit sending for calls with sending in progress 112. It is the function of this task to operate and release the B relay of the trunk interface 30a in the proper timed sequence to cause valid rotary-type digits to be dialed to the PBX 16 on communication line 34.

Another task 114 requiring timed intervals is the task of scanning trunk interfaces for new events. To perform this task, the processor 90 accesses the status of the various trunk interface detecting circuits using the control logic 48 of the respective trunk interfaces 30a–30n. The processor 90 maintains a record of the previous status of the detecting circuits in RAM memory 94. By comparing this record wit h the current status acquired during the scanning task, the processor 90 is able to determine when a change in status has occurred. Such changes are converted into the appropriate event to be stored in the corresponding TCB for later use by the base level executive program in determining the proper steps needed for processing the call.

A third task 116 requiring timed intervals is the task of scanning the DTMF receivers 58 for the receipt of new digits. This is done through the receiver control logic 64 in conjunction with a capability of the DTMF receiver 58 to provide an indication accessable by the processor 90 when a new digit has been received. If a new digit is received, the processor 90 prepares a new digit event to be loaded in the TCB of the trunk interface 30a associated with the particular DTMF receiver 58 which received the digit.

A fourth task 118 requiring timed intervals involves performing the timing tasks and checking for new events due to the expiration of timers. The processor 90 must be able to detect when a call has been in a particular state for more than a specific amount of time in order to determine when to proceed in processing the call. One example of this need is the need to determine when a call in the delayed intercept mode has been ringing the PBX operator 22 for the specified intercept delay time without receiving an answer signal from the PBX. After the expiration of this predetermined interval of time in this mode the call must be intercepted and the caller given an opportunity to complete his own call. Timing for cases such as this are performed by the timing task 118. The processor 90 keeps data areas in RAM memory 94, hereinbefore referred to as timers, for this purpose. The timers are loaded with appropriate values by the processor 90 when performing the call sequencing task 106. The timing task 118 substracts one from the timer value each time a fixed amount of time has elapsed. When the timing task finds that a timer value has reached zero (after successive subtractions) the timer expires and the appropriate time out event is prepared to be loaded in the corresponding TCB to initiate further sequencing of the call.

The final clock level executive 110 task 120 is the loading of any new events determined by the other clock level executive tasks into appropriate TCB's for call sequencing by the base level executive.

Figure 9:
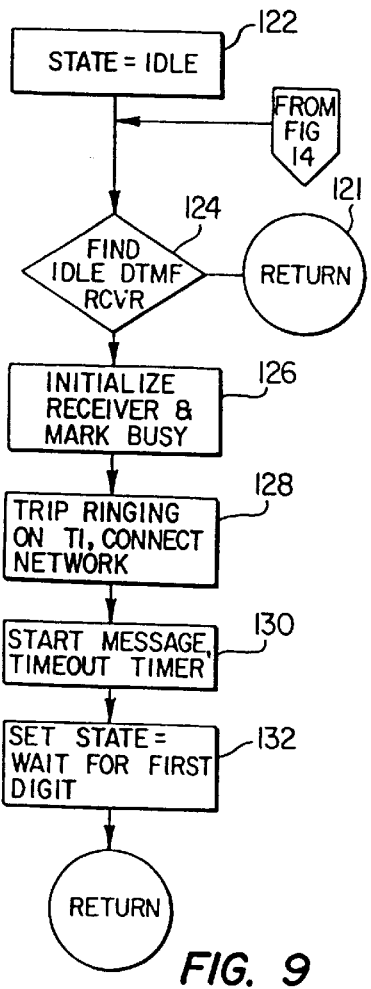

FIG. 9 of the drawings shows the sequence of steps carried out by the processor 90 when the event processed is the detection of a new call by the presence of ringing on an incoming CO trunk 20. Initially, the state of the particular incoming trunk is noted as being Idle in the TCB as shown by block 122. When in the mode where all calls are intercepted and according to the RAM memory map of the state of the PBX intercept apparatus 24, the processor 90 searches 124 for an idle DTMF receiver 58. If all of the DTMF receivers 58 are busy, the processor returns 120 to the base level program 100. Based upon the frequency of occurrence of incoming calls over CO trunks 20 the PBX intercept 24 is designed to statistically accommodate the majority of new calls. If the memory map shows that a DTMF receiver 58 is idle and thus available, the processor proceeds to initialize 126 that receiver and mark it busy in such memory map. When marked busy, the DTMF receiver 58 becomes dedicated to the particular incoming trunk 20 for receiving digits thereover and for transferral to the receiver control logic 64. When the processor 90 secures a DTMF receiver 58 for use, two command instructions are issued from the processor 90 to first, trip ringing 128 in the trunk interface to signal the central office 12 of acknowledgment of the call, and second, to cause a connection to be established in the analog switching matrix 36 for connecting the requesting incoming trunk 20 to the idle DTMF receiver 58.

As noted before in connection with FIG. 6a, the CPU 32 maintains current information as to the status of each phase of the skewed message output from the digital announcement circuit 38. Accordingly, the CPU 32 selects the message phase 130 which commences at least within the next six-seconds, and issues a command instruction to the crosspoint matrix 62 (through the receiver control logic 64) to establish a matrix connection between the next-starting message phase and the two-wire to four-wire hybrid 60 assigned, by virtue of the switching matrix 36 crossconnect, and thus to the CO trunk 20 requesting service. In addition, as noted by functional block 130 of FIG. 9, the CPU 32 initiates a timer which is used to determine whether telephone extension digits have been received pursuant to the instructional message transmitted to the calling party. As noted by functional block 132, the processor 90 sets the state of the illustrative call in the TCB to "Wait For First Digit". The processor 90 then returns to the base level program 100.

Figure 10:
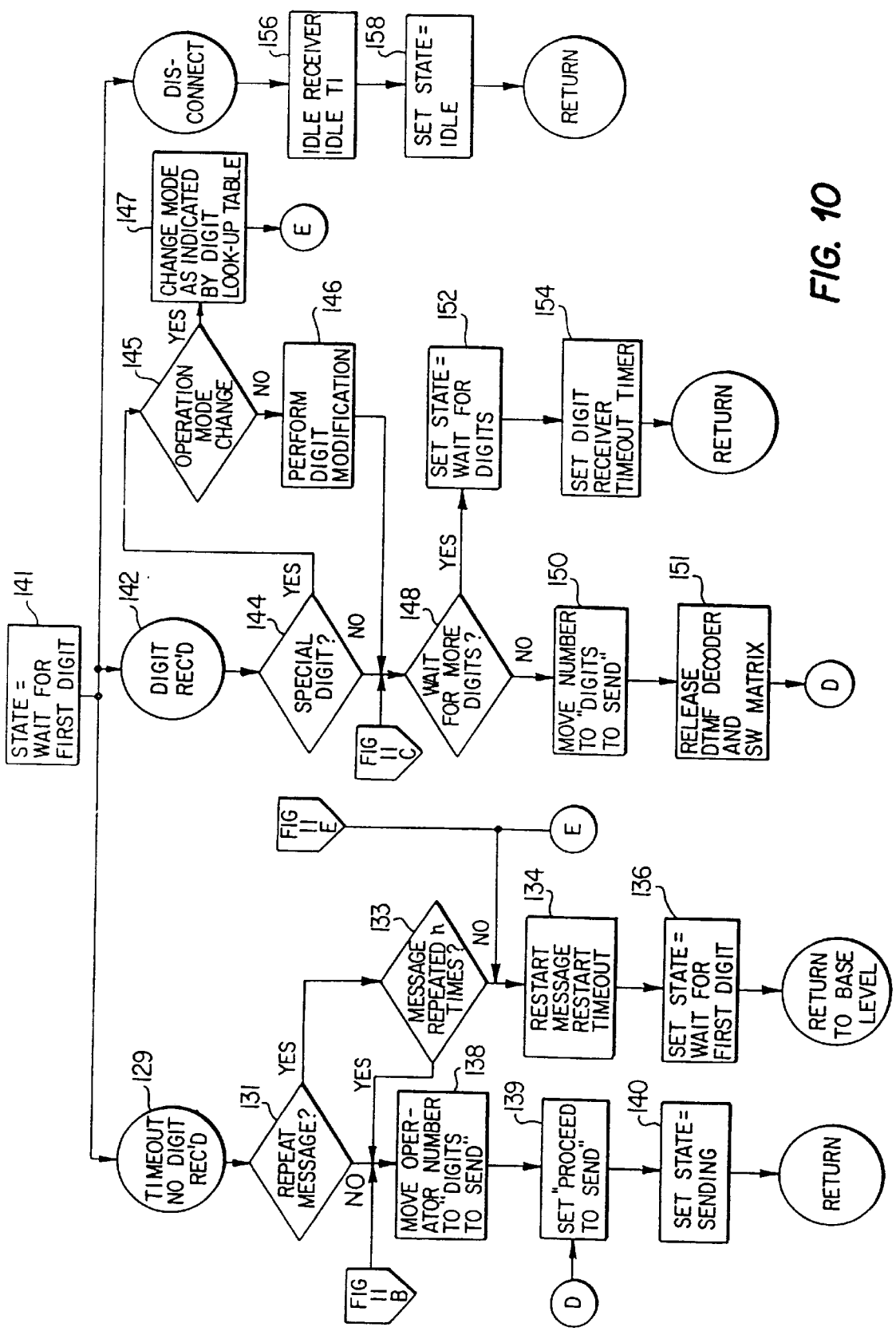

Reference is now directed to FIG. 10 for the processor operations concomitant with the "Wait For First Digit" state of the exemplary call. The left hand part of FIG. 10 shows the branch taken by the processor 90 if a time-out 129 has occurred and no digit has yet been received from the calling party. According to FIG. 10, and based upon the programming determinations of the particular installation, the message directed to the calling party may be repeated 131 a predetermined number of times 133, whereupon the message is restarted and the time period reinitiated 134. The state of the call is maintained at "Wait For First Digit" 136.

If the message is not to be repeated, or has been repeated a predetermined number of times, it can safely be assumed that the calling party desires the assistance of the operator, and thus the extension number of the operator or attendant is prepared for sending to the PBX over the PBX communication line 34, as noted in functional block 138. In this situation the state of the call is set to "Sending" 140 and the attendant or operator's number is transmitted to the PBX switching system 16 by appropriate pulsing of the trunk interface B relay. The interval timer 96 is utilized by the processor 90 to control the B relay cycling to generate the pulse and interpulse intervals of the dial pulses sent to the PBX switching system 16. While the present invention employs dial pulsing as a means of transmitting dialing information to the PBX 16, the transmission of DTMF signals may also be used.

In the event a digit has been received by the DTMF decoder 58 during the state "Wait For First Digit", the digit received functional block 142 of FIG. 10 is entered by the processor 90. The first digit received is analyzed to determine if it is a special digit 144 which requires further processing. One of the types of further processing is the change of mode of operation of the PBX intercept 24 when the dialed digits found in the Look-up Table so indicate. Mode checking is performed as indicated in FIGS. 10 and 11. After the RAM memory 94 locations used by the processor to store the current mode of operation are altered to show a newly requested mode of operation 147, the message is repeated 134 to allow the caller an opportunity to complete the desired call. In another type of further processing the invention provides for conventional digit deletion, modification or insertion 146 before sending the resultant digits to the PBX switching system 16. Digit modification or translation may be desired where, for instance, a person served by the PBX system 16 is temporarily located at a different extension, whereby the caller's dialing of the party's prior extension will result in the outpulsing from the intercept equipment 24 of the new extension number where the called party can be reached. This feature can be accomplished by utilizing a software look-up table which is referred to by the processor 90 to check the table against the dialed number to determine if digit modification is required. If the dialed number is found in the table, then the processor 90 is directed to a correlation table where the dialed number is correlated to the number outpulsed to the PBX switching system 16. For example, single digit dialed numbers such as "0" (operator), "1" (sales) or "2" (marketing) may be found by the processor 90 in the look-up table, and then correlated to respective extension numbers 5321, 5872 and 5881 which are appropriately outpulsed to the PBX 16. It is seen that this scheme works best when the abbreviated digits are not the same as the most significant digits of the PBX extension number plan. Also, this feature is not limited to single digit abbreviated dialing as illustrated, but is applicable to multiple digit dialing.

Most commonly, and as concerns nonabbreviated dialing, the first digit received will be the most significant digit of the number assigned to one of the PBX extensions, and thus will not be delineated as a special digit in the look-up table. In such a case, the processor 90, after having received the first digit will wait for more digits 148 and upon the receipt of the full number of digits of the extension number the processor will move the digits to the "Digit to Send" sub-field 150 of the TCB. The DTMF receiver 58 will be released and the associated analog switching matrix 36 connection will be released, as noted by functional block 151. The full complement of digits having been received is prepared for outpulsing by entering the "Sending" state through the intermediate state "Proceed to Send" 139.

In the event the system determines at functional block 148 that more digits are to be received, the state of the call is set to "Wait for Digits" 152, and the digit reception time-out timer is set 154.

While not shown in the disclosed embodiment, those skilled in the art will realize that the known technique of overlapping the receipt of subsequent digits with the sending of digits to the PBX 16 may be employed to expedite the processing of the call. In the illustrated embodiment, however, the sending of the digits to the PBX switching system 16 commences when the end of dialing has been determined. As noted above, sending of digits to the PBX 16 is initiated by moving the required digits to the "Digit to Send" sub-field of the TCB, releasing the digit receiver register and the network connection associated therewith. The call is then set to the "Sending" state and the processing of another call is commenced by returning to the base level program 101.

Should a disconnect event be received while a call is in the "Wait For First Digit" state 141 the DTMF receiver 58 and the trunk interface 30a are idled 156. The call is set to the "Idle" state 158 and return is had to the base level program 101.

With reference now to FIG. 11, there is shown the actions performed by the PBX intercept 24 when a call is in the "Wait for Digit" state 160. If a time-out event occurs, actions are then taken to connect the call to an operator or other predefined destination as noted previously. If a "Digit Received" event 162 occurs a determination of whether special digit treatment 164, as previously described, is necessary is made, and if so it is then carried out. It is then determined whether more digits are to be received or if the receipt of digits has terminated and the appropriate actions are carried out as noted above. If a "Disconnect" event 168 occurs while the call is in the "Wait for Digit" state 160, the DTMF receiver 58 and trunk interface 30a are idled 170, the call is set to the "Idle" state 172 and again return is had to the base level program 101.

FIG. 12 illustrates the actions performed by the disclosed embodiment of the present invention when a call is in the "Sending" state 174. If a "Disconnect" event is received the trunk interface 30 is idled, and if a DTMF receiver 58 is in use it too is idled 178, along with the network connection and the interface 30a. A return to base level program 101 is then executed.

If, on the other hand, no "Disconnect" event is received the PBX intercept 24 seizes the PBX switching system 180, and the PBX intercept 24, according to the illustrative call, waits for the receipt of a signal from the PBX 16 acknowledging the seizure of the PBX switching system 182. In the event such an acknowledgment is not received within a predetermined period of time, a time-out 182 is executed, whereupon the telephone extension digits are transmitted to the PBX 16 using prescribed digit and interdigit timing criterion 184. After the digits are sent to the PBX 16 the trunk interface 30a is connected to the PBX switching system 186 while the PBX completes the processing of the transmitted digits to establish a call path between the dedicated communication line 34 and the called telephone extension 14. The state of the call is then set to the "Conversation" state 188.

While the illustrated embodiment provides for the receipt of dialing information from the calling party, and the examination of such information before the subsequent transmission thereof to the PBX 16, those skilled in the art may prefer to pass the dialing information directly through the trunk interface to the PBX switching system 16 without intermediate examination or processing. However, in the illustrated embodiment maximum control is had over the dialing information by providing for digit examination and/ or modification.

Figure 13:
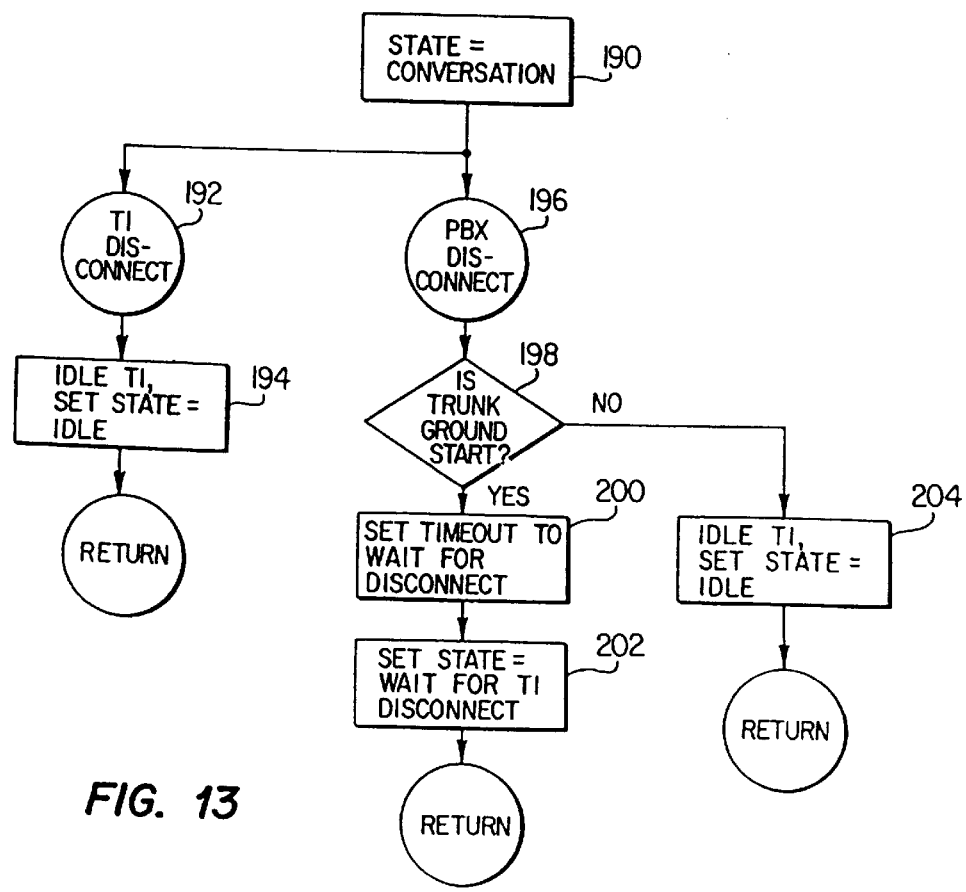

After the dialing information has been transferred to the PBX switching system 16, the PBX intercept 24 sets the state of the illustrated call to "Conversation" 190, as shown in FIG. 13. During the processing of a call the PBX intercept 24 monitors the input ports (trunk interfaces 30a–30n) and its output ports (PBX interfaces) to determine if disconnect signals or indications appear on either such port. In accordance with another important feature of the invention, if the PBX intercept system 24 is connected to the PBX 16 by a trunk capable of passing disconnect supervision, such as a ground-start or DID type of trunk, then in these cases the intercept system 24 can determine when the conversation has ended from the PBX side of the system. An advantage flowing from the use of a ground-start trunk (or a DID type of trunk) is that after the conversation between the calling party and the called party has been terminated by an on-hook condition by the called party, the calling party can place additional calls through the PBX intercept 24 without the need to also go on-hook by simply dialing again to place additional calls to the PBX 16. With reference to this feature in FIG. 13, the CPU 32 determines if the PBX side trunk is of the disconnect supervision type 198, and if so, the software sets the time-out for a "Wait for TI Disconnect" 200 and the state of the call is also set to the "Wait for TI Disconnect" state 202. If, on the other hand, the PBX communication line 34 is not a special type trunk, the trunk interface is set to the "Idle" state 204 irrespective of which party went on-hook. Again, return is then had to the base level program 101.

Figure 14:
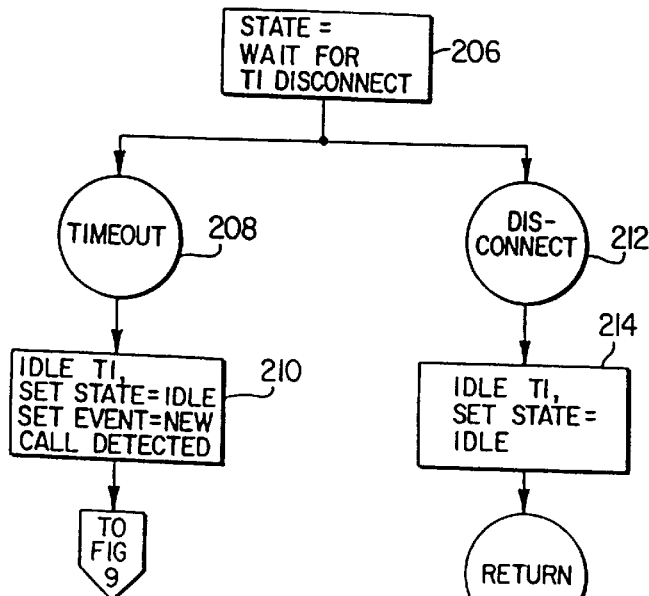

FIG. 14 illustrates the situation, as noted above, where the calling party 10 has not gone on-hook after the completion of a call, but rather wishes to initiate another call to the PBX switching system 16. While in the "Wait for TI Disconnect" state 206, and if a time-out event 208 occurs signifying that the calling party 10 has not disconnected, then the system software sets the state of the call to "Idle" and the event to "New Call Detected" 210. In this manner the PBX intercept 24 acts on the call as if it were a new call, and the processor 90 proceeds in accordance with the "Idle" state 116 as shown in FIG. 9.

With regard yet to FIG. 14, if a "Disconnect Event" 212 is detected the pertinent trunk interface 30a. is idled and the call is set to the "Idle" state 214. Return is then again had to the base level program 101.

From the foregoing it is seen that the PBX intercept system 24 provides an enhanced capability when used in conjunction with an attendant-served on-premise switching system. With the provision of the present invention callers may more directly and more expeditiously complete calls to desired telephone station sets. As a result, the attendant associated with the on-premise system is relieved of the task of completing calls in those instances where assistance is not actually required, whereby the attention of the attendant can be more readily directed to those calls which indeed require assistance, i.e., where the telephone number of the party to be called is not known by the calling party. In addition, the PBX intercept serves, in certain situations as an intermediate system for completing a plurality of calls from a calling party to an on-premise system without the need of the calling party going on-hook after each such call. Therefore, it is clearly evident that the delineated objects and features of the inventions will be accomplished.

It is also seen that the PBX intercept system is provided with the capability of operating in various modes which include the integration of the personalized service of on-premise attendants with the option of allowing callers the opportunity to complete their own calls if, within a period of time, assistance has not been had by an attendant.

Various modifications may suggest themselves to those skilled in the art without departing from the spirit of the invention. For example, the outside switching system 12 need not be of the central office type as illustratively described above, but rather need only be some type of facility which is capable of transmitting communications intelligence. The invention is thus not to be restricted to the specific forms shown or the uses mentioned, except as to the extent indicated.

What is claimed is:

1. A method of providing a processor system routing of incoming telephone calls to respective telephone destinations coupled to a switching system, comprising the steps of:

coupling the incoming telephone calls to the switching system under control of a program controlled processor by using a program memory to cause said processor to process the incoming telephone calls originating external to the switching system, and not originating by way of internal extension lines, and cause routing of the incoming telephone calls toward said respective destinations;

instructing calling parties associated with the incoming telephone calls with a respective voice instruction phrase to input digit information corresponding to respective telephone destinations, and instruct calling parties with another respective voice instruction phrase to input single digit information for connection to an attendant;

coupling said voice instruction phrases to the calling parties via a switching subsystem and not by way of either an attendant trunk or an operator line;

using a reference memory programmed to store data correlating digit information input thereto to different digit information output therefrom, said digit information input to said reference memory being associated with said telephone destinations; and using said program memory programmed to include instructions for
a) controlling said program controlled processor to convert stored voice instruction data thereof to said voice instruction phrases,
b) processing the digit information input by the calling parties for accessing said reference memory with digit information, c) using said processed digit information to access said reference memory to determine if output digit information is correlated therein; and if output digit information is correlated in said reference memory to said digit information input thereto, then causing the program controlled processor to use the correlated output digit information to cause a connection to be made to a destination associated with the output of said reference memory.

2. The method of claim 1, further including programming said program memory to control said program controlled processor in a plurality of states for completing a call to a desired destination, one state of the plurality of states for receiving digit information input respectively by the calling parties and determining whether respective additional digit information inputs are to be expected.

3. A method of providing a program controlled processor and using said program controlled processor for controlling the routing of telephone calls to at least one destination connected to a computer controlled call handling system, comprising the steps of:

providing said program controlled processor to;
a) receive a telephone call from a calling party originating the telephone call external to the computer controlled call handling system and not by internal extension lines connected to the computer controlled call handling system;
b) control a telephonic transmission facility for transmitting information to the calling party;
c) control a message storage unit so as to couple said message storage unit to said telephonic transmission facility, for transmitting instructional messages to the calling party, said message storage unit being programmed with at least two different instructional messages, one message being an instruction to input destination determining information transmitted during a first time of day and a second instructional message to input destination determining information transmitted during a second time of day; and
d) control routing of a telephone call by the calling party toward a destination under control of said program controlled processor, using the destination determining information received from the calling party.

4. A method for controlling the routing of telephone calls to internal destinations connected to a computer controlled call handling system, comprising the steps of:
a) receiving telephone calls by an input interface from calling parties external to the computer controlled call handling system and not connected thereto by internal extension lines;
b) transmitting a verbal message via a switching subsystem to said input interface for transmission thereon of the verbal message, said input interface carrying said verbal message to the calling parties by way of said switching subsystem and not by way of either an attendant trunk or an operator line;
c) participating in routing of the calls by a processor and a program memory based on information input by the calling parties;
d) responding by said processor to destination determining information if input by any of the calling parties to cause a routing based on the destination determining information input by said any calling parties; or
e) responding by said processor to an absence of receipt of destination determining information from any one calling party within a specified period of time and causing a routing to be made from the one calling party to a predetermined destination.

5. A method for controlling the routing of telephone calls to internal destinations connected to a computer controlled call handling system, comprising the steps of:
a) receiving telephone calls by an input interface from calling parties external to the computer controlled call handling system and not connected thereto by internal extension lines;
b) transmitting a verbal message via a switching subsystem to said input interface for transmission thereon of the verbal message, said input interface carrying said verbal message to the calling parties by way of said switching subsystem and not by way of either an attendant trunk or an operator line;
c) participating in routing of the calls by a processor and a program memory based on information input by the calling parties;
d) responding by said processor to destination determining information if input by any of the calling parties to cause a routing based on the destination determining information input by said any calling parties; or
e) placing a telephone call to a destination determined by associating digit information if input by the calling parties with preprogrammed destination information.

6. A call processor for use in conjunction with a telephone switching system for processing an incoming call directed to the switching system and allowing a calling party to complete the call directly to a destination associated with the switching system, comprising:

a receiver for receiving a telephone directory number call to a business entity utilizing the telephone switching system and for preventing the switching system from routing such call to a call completion assistant;

a detector for detecting a request for service from the calling party initiating a call to the telephone switching system;

said call processor being responsive to the detection of the request for service by said detector for causing a connection path to be established to the calling party;

a message announcer for generating a message for transmission to the calling party via said connection path;

said processor being responsive to said detector detecting said request for service for controlling said message announcer to transmit said message to the calling party;

an interface for connecting a voice grade telephone line to said telephone switching system;

a telephone line signaler for requesting service of said telephone switching system by signalling over said telephone line;

said call processor being programmed to wait a period of time to receive a tone on the telephone line to assure an acknowledgment of the request for service by the telephone switching system; and said processor transmitting said telephone number over the telephone line to said telephone switching system subsequent to the receipt on the telephone line of an acknowledgment of a request for service of the switching system so that a communication path can be established between the calling party and the destination.

7. In a communication system of the type in which a computer controlled call handling system is coupled to a programmed processor by a communication line, a method of providing a processor for controlling the routing of telephone calls to at least one destination connected to the computer controlled call handling system, comprising the steps of:

providing a program controlled processor that;
a) receives a request for service in response to a calling party originating a telephone call external to the computer controlled call handling system and not by internal extension lines connected to the computer controlled call handling system;
b) controls a telephonic transmission facility for transmitting an information message to the calling party;
c) controls a message storage unit so as to couple said message storage unit to said telephonic transmission facility, for transmitting the information message to the calling party, said message storage unit being programmed with at least two different information messages;
d) transmits one said information message during a first time of day, and transmit a second information message during a second time of day; and
e) controls routing of a telephone call by the calling party toward a destination under control of said program controlled processor, using the destination determining information received from the calling party.

* * * * *